United States Patent
Reytier et al.

(10) Patent No.: US 11,108,061 B2
(45) Date of Patent: Aug. 31, 2021

(54) WATER ELECTROLYSIS OR CO-ELECTROLYSIS REACTOR (SOEC) OR FUEL CELL (SOFC) FOR PRESSURIZED OPERATION AND WITH A CLAMPING SYSTEM SUITABLE FOR SUCH OPERATION

(71) Applicant: COMMISSARIAT A L'ENERGIE ATOMIQUE ET AUX ENERGIES ALTERNATIVES, Paris (FR)

(72) Inventors: Magali Reytier, Villard de Lans (FR); Charlotte Bernard, Contamine sur Arve (FR); Guilhem Roux, Saint-Egreve (FR); Philippe Szynal, Chignin (FR)

(73) Assignee: COMMISSARIAT A L'ENERGIE ATOMIQUE ET AUX ENERGIES ALTERNATIVES, Paris (FR)

( * ) Notice: Subject to any disclaimer, the term of this patent is extended or adjusted under 35 U.S.C. 154(b) by 95 days.

(21) Appl. No.: 16/613,605

(22) PCT Filed: May 9, 2018

(86) PCT No.: PCT/EP2018/062151
§ 371 (c)(1),
(2) Date: Feb. 25, 2020

(87) PCT Pub. No.: WO2018/210683
PCT Pub. Date: Nov. 22, 2018

(65) Prior Publication Data
US 2020/0212454 A1    Jul. 2, 2020

(30) Foreign Application Priority Data

May 15, 2017   (FR) ...................... 1754260

(51) Int. Cl.
*H01M 8/028* (2016.01)
*H01M 8/2428* (2016.01)
(Continued)

(52) U.S. Cl.
CPC ............... *H01M 8/028* (2013.01); *C25B 1/04* (2013.01); *C25B 9/05* (2021.01);
(Continued)

(58) Field of Classification Search
CPC ............... H01M 8/028; H01M 8/2428; H01M 8/04753; H01M 8/248; H01M 2008/1293; C25B 1/04; C25B 9/05
See application file for complete search history.

(56) References Cited

U.S. PATENT DOCUMENTS 6,689,499 B2    2/2004  Gillett et al.
2002/0081471 A1  6/2002  Keegan et al.
(Continued)

FOREIGN PATENT DOCUMENTS

FR    2 957 361 A1    9/2011
FR    3 040 061 A1    2/2017
(Continued)

OTHER PUBLICATIONS

International Search Report dated Jul. 12, 2018 in PCT/EP2018/062151 filed May 9, 2018.
(Continued)

*Primary Examiner* — Stewart A Fraser
(74) *Attorney, Agent, or Firm* — Oblon, McClelland, Maier & Neustadt, L.L.P.

(57) ABSTRACT

A clamping chamber in a reactor or fuel cell architecture having a stack of elementary units is above the clamping fittings. The clamping chamber, in which a gas other than the reactive gases will flow, is substantially at the same pressure as the reactive gases in the stack. The pressure of the gas flowing in the clamping chamber above the stack of elementary units will then balance the pressure created by the reactive gases and the gases produced within the stack.

24 Claims, 12 Drawing Sheets

Figure 1:
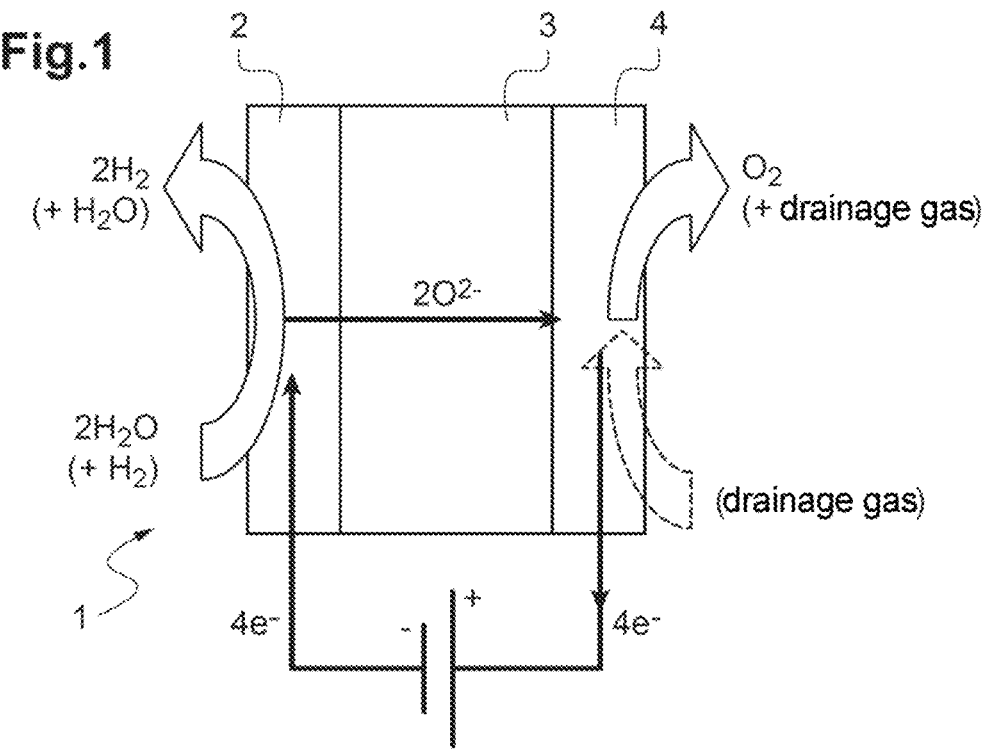

(51) Int. Cl.
*H01M 8/04746* (2016.01)
*H01M 8/248* (2016.01)
*C25B 1/04* (2021.01)
*C25B 9/05* (2021.01)

(52) U.S. Cl.
CPC ....... *H01M 8/04753* (2013.01); *H01M 8/248* (2013.01); *H01M 8/2428* (2016.02)

(56) References Cited

U.S. PATENT DOCUMENTS

| | | | |
|---|---|---|---|
| 2004/0043275 A1 | 3/2004 | Mattejat et al. | |
| 2008/0081233 A1* | 4/2008 | Rechberger | H01M 8/04074 429/423 |
| 2017/0362724 A1 | 12/2017 | Planque et al. | |
| 2019/0013539 A1* | 1/2019 | Reytier | C25B 11/036 |

FOREIGN PATENT DOCUMENTS

| | | |
|---|---|---|
| FR | 3 045 215 A1 | 6/2017 |
| WO | WO 96/36086 A1 | 11/1996 |
| WO | WO 02/27836 A2 | 4/2002 |
| WO | WO 2004/077587 A2 | 9/2004 |
| WO | WO 2016/096752 A1 | 6/2016 |

OTHER PUBLICATIONS

French Preliminary Search Report dated Nov. 13, 2017 in French Application 17 54260 filed on May 15, 2017, 3 pages (with English Translation of Categories of Cited Document).

* cited by examiner

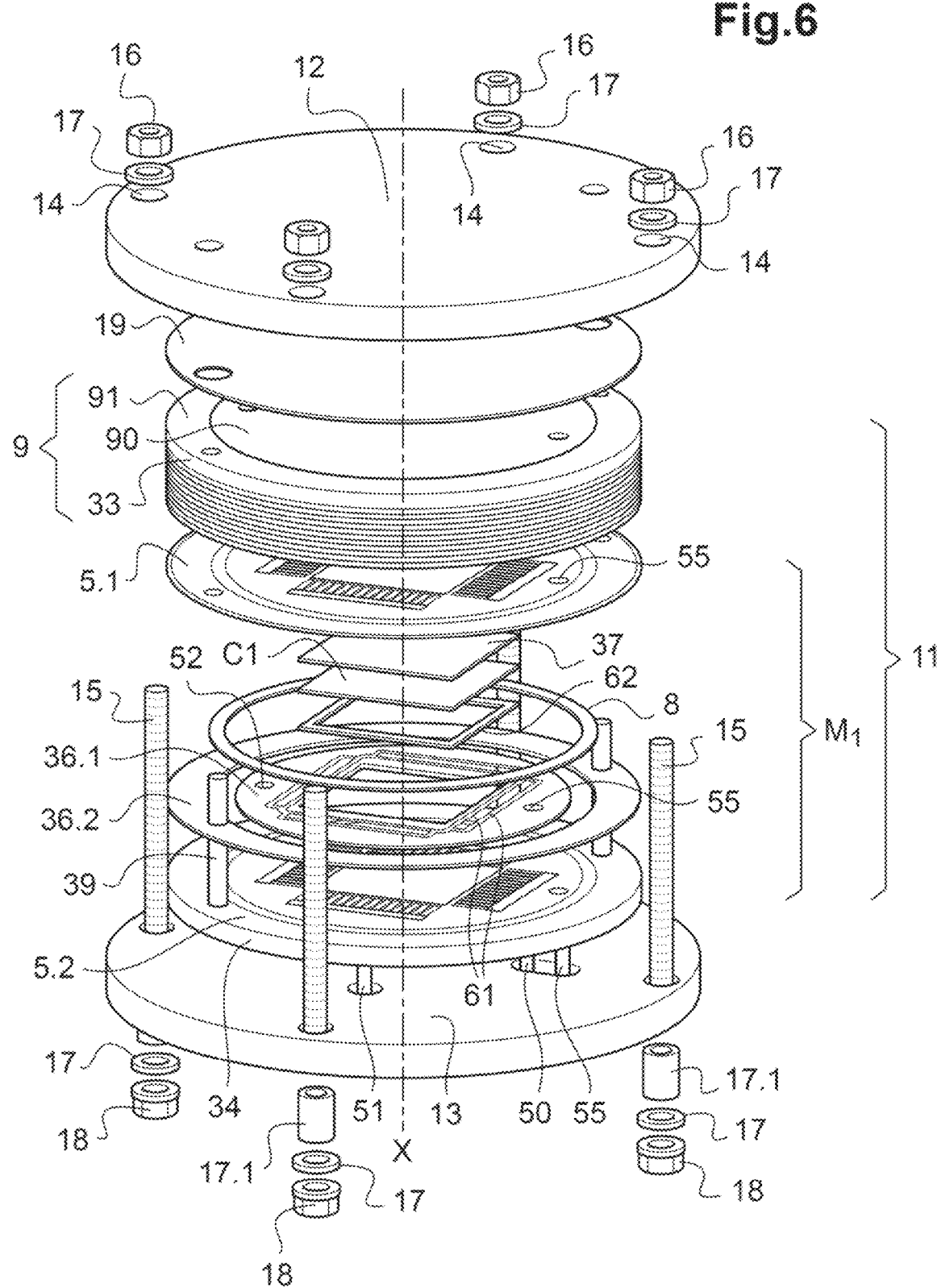

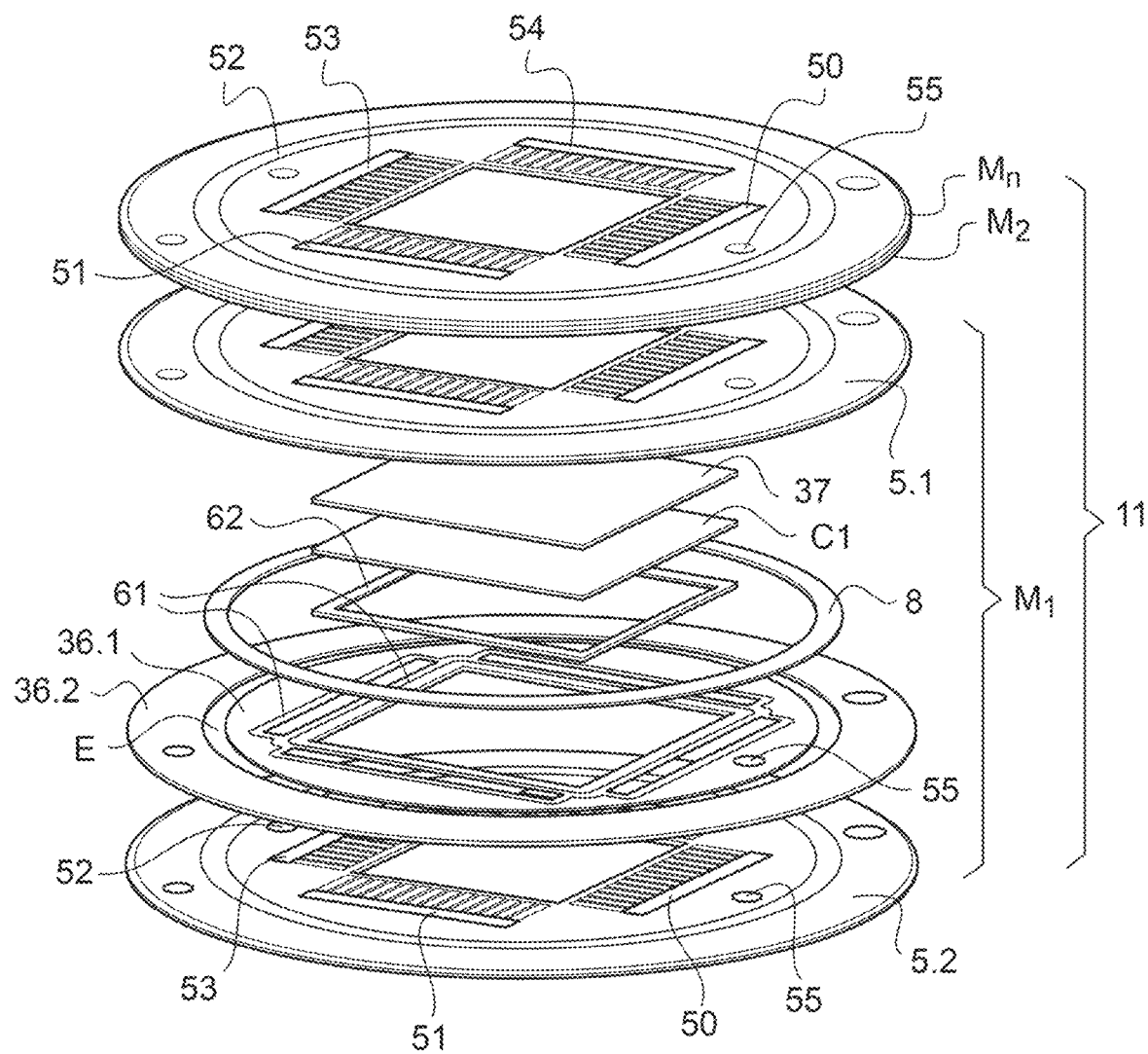

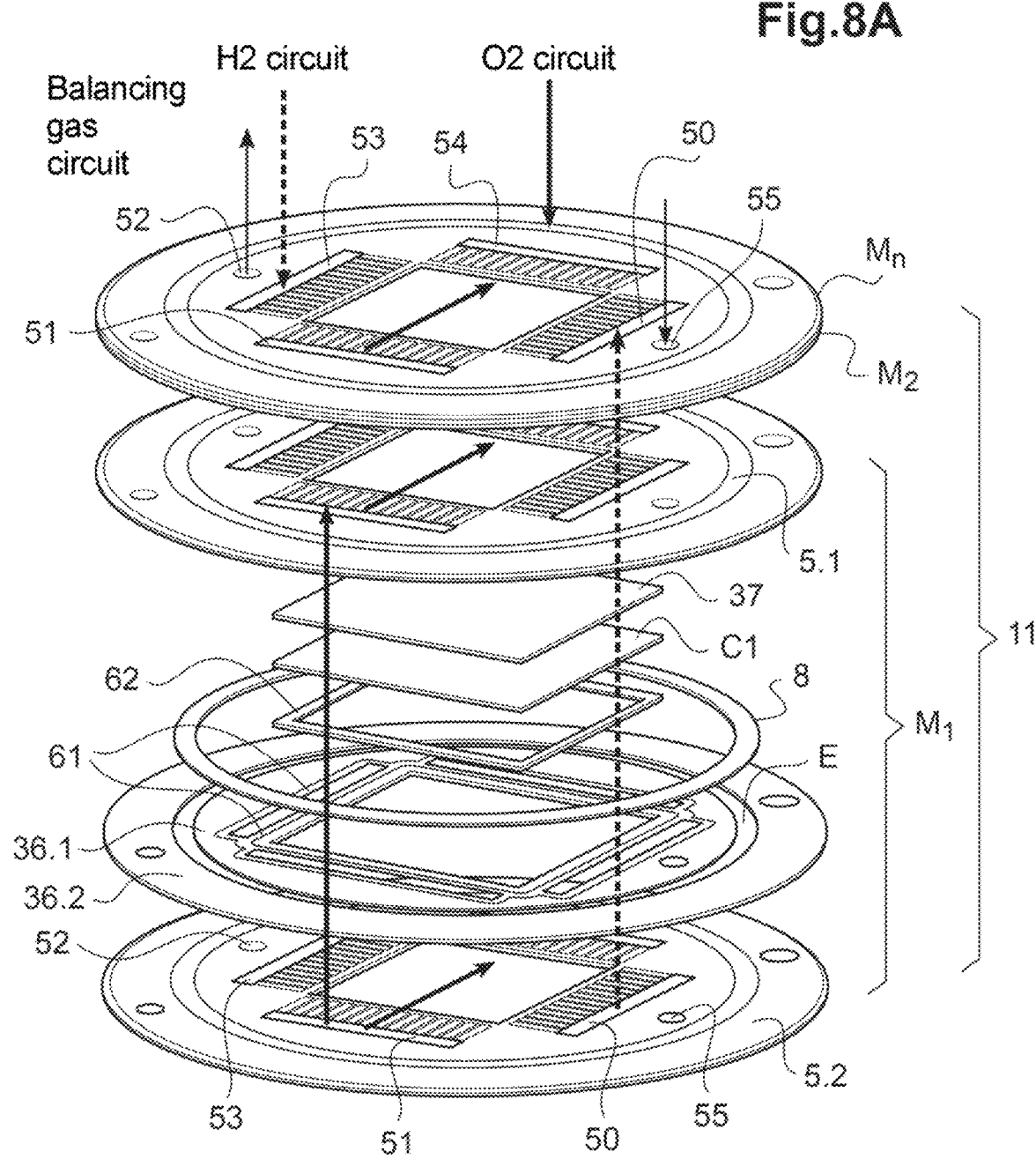

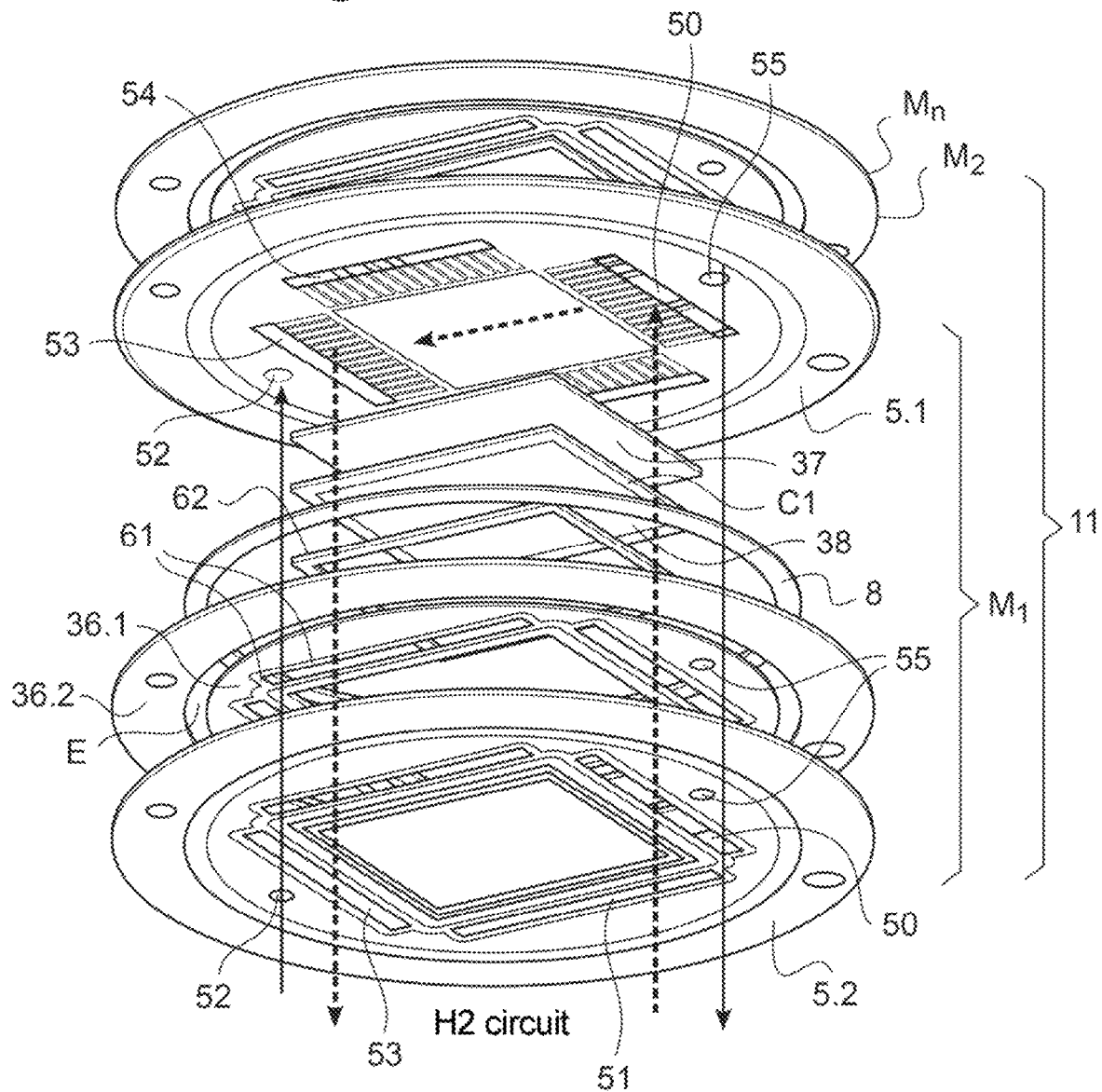

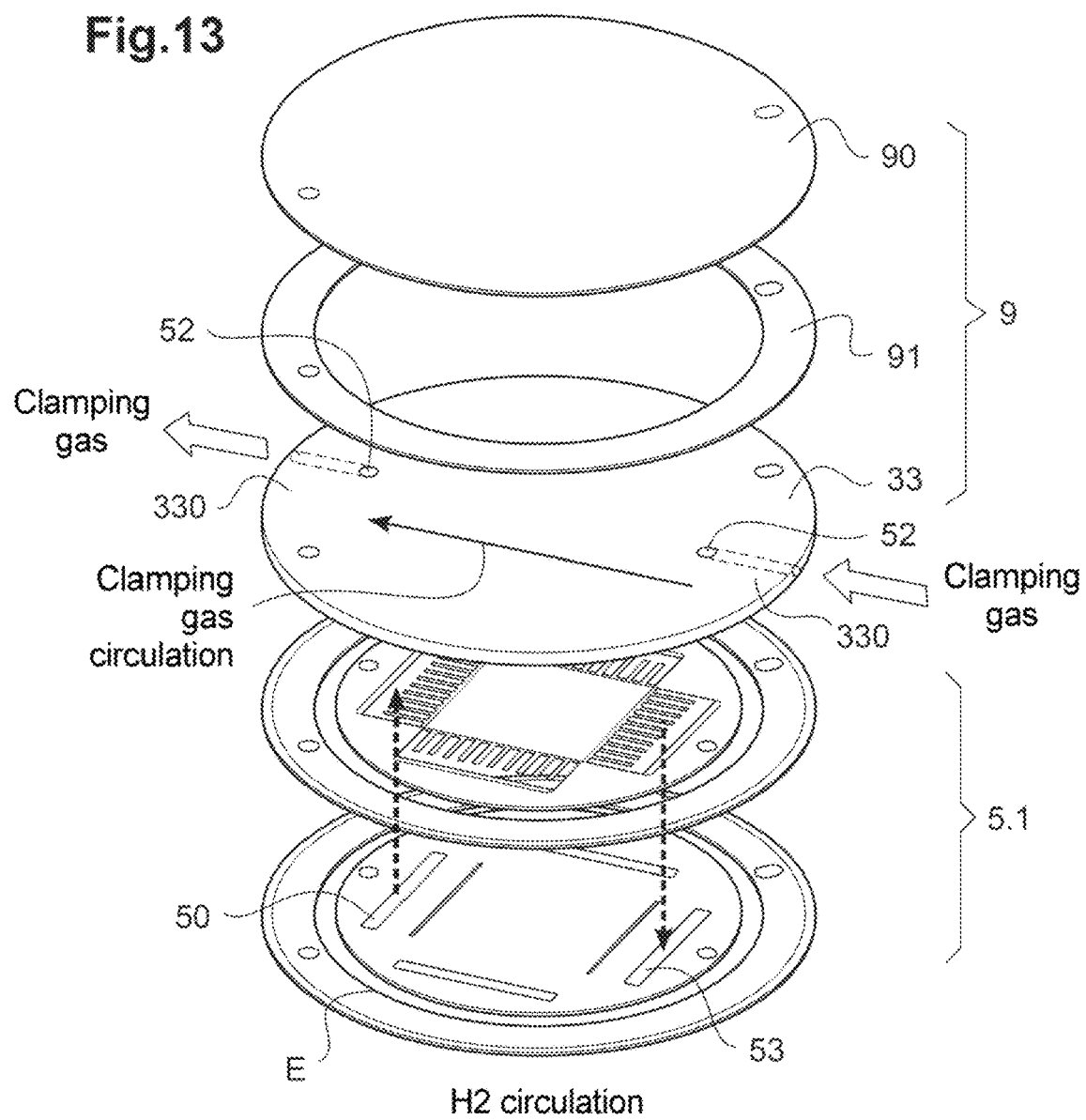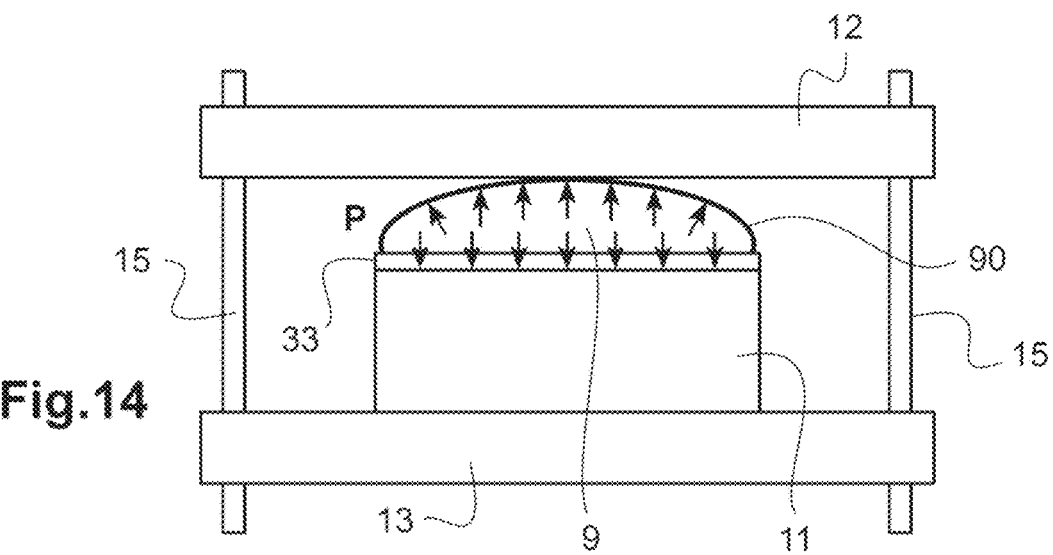

WATER ELECTROLYSIS OR CO-ELECTROLYSIS REACTOR (SOEC) OR FUEL CELL (SOFC) FOR PRESSURIZED OPERATION AND WITH A CLAMPING SYSTEM SUITABLE FOR SUCH OPERATION

TECHNICAL FIELD

The present invention relates to the field of solid oxide fuel cells (or SOFC, the English abbreviation for "Solid Oxide Fuel Cell"), the field of high temperature water electrolysis (known as EHT, or EVHT for "high temperature water vapor electrolysis" in French, or HTE, the English abbreviation for "High Temperature Electrolysis", or HTSE, the English abbreviation for "High Temperature Steam Electrolysis"), also using solid oxides (SOEC, the English abbreviation for "Solid Oxide Electrolyzer Cell"), and the field of high temperature co-electrolysis of water and of another gas chosen from carbon dioxide $CO_2$ and nitrogen dioxide $NO_2$.

More particularly, the invention relates to the construction of a high temperature water electrolysis or co-electrolysis (EHT) reactor of the SOEC type, or of a fuel cell of the SOFC type, which has a stack of elementary electrochemical cells that are kept clamped together regardless of the temperature, and which operates under pressure without the need for a pressurized sealed enclosure.

Although described primarily with reference to the application of high temperature water electrolysis, the invention may also be applied to co-electrolysis of water and another gas chosen from carbon dioxide $CO_2$ and nitrogen dioxide $NO_2$, as well as to an SOFC fuel cell.

The invention is applicable to an SOFC fuel cell using either hydrogen or a hydrocarbon such as methane, $CH_4$, as its fuel.

PRIOR ART

The electrolysis of water comprises an electrolytic reaction which decomposes the water into gaseous dioxygen and dihydrogen, with the aid of an electric current, according to the reaction:

$$H_2O \rightarrow H_2 + \tfrac{1}{2}O_2.$$

To perform water electrolysis, it is advantageous to do it at a high temperature, typically between 600° C. and 950° C., because some of the energy required for the reaction may be supplied by the heat, which is less costly than electricity, and the activation of the reaction is more effective at high temperature and does not require a noble metal catalyst. To carry out electrolysis at high temperature, there is a known method of using an electrolyzer of the type known as SOEC (the English abbreviation for "Solid Oxide Electrolyzer Cell"), consisting of a stack of elementary units, each comprising a solid oxide electrolysis cell consisting of three layers superimposed on one another in an anode/electrolyte/cathode arrangement, and metal alloy interconnecting plates, also called bipolar plates or interconnectors. The interconnectors have the function of providing for both a flow of electric current and the flow of gases in the vicinity of each cell (with water vapor injected and hydrogen and oxygen extracted in an EHT electrolyzer, or with air and hydrogen injected and water extracted in an SOFC cell), and of separating the anode and cathode compartments, which are the compartments for the gas flow at the anodes and the cathodes of the cells respectively. To carry out high temperature water vapor electrolysis (EHT), water vapor ($H_2O$) is injected into the cathode compartment. Under the effect of the current applied to the cell, the dissociation of the water molecules in vapor form takes place at the interface between the hydrogen electrode (cathode) and the electrolyte: this dissociation produces dihydrogen gas ($H_2$) and oxygen ions. The dihydrogen is collected and discharged at the outlet of the hydrogen compartment. The oxygen ions, $O^{2-}$, migrate through the electrolyte and recombine into dioxygen at the interface between the electrolyte and the oxygen electrode (anode).

As shown schematically in FIG. 1, each elementary electrolysis cell 1 is formed by a cathode 2 and an anode 4, placed on either side of a solid electrolyte 3, usually in the form of a membrane. The two electrodes (cathode and anode) 2, 4 are electrical conductors, of porous material, and the electrolyte 3 is impermeable to gas, an electron insulator and an ion conductor. In particular, the electrolyte may be an anion conductor, or more precisely an anion conductor of $O^{2-}$ ions, and the electrolyzer is then called an anion electrolyzer.

The electrochemical reactions take place at the interface between each of the electron conductors and the ion conductor.

At the cathode 2, the half reaction is as follows:

$$2H_2O + 4e^- \rightarrow 2H_2 + 2O^{2-}.$$

At the anode 4, the half reaction is as follows:

$$2O^{2-} \rightarrow O_2 + 4e^-.$$

The electrolyte 3, intercalated between the two electrodes 2, 4, is the site of the migration of the $O^{2-}$ ions under the effect of the electrical field created by the potential difference established between the anode 4 and the cathode 2.

As shown between the brackets in FIG. 1, the water vapor at the cathode inlet may be accompanied by hydrogen $H_2$, and the hydrogen produced and recovered at the outlet may be accompanied by water vapor. Similarly, as shown in broken lines, a drainage gas such as air may also be injected at the inlet to discharge the oxygen produced. The injection of a drainage gas has the additional function of acting as a thermal regulator and facilitating the pressure regulation of the anode chamber.

An elementary electrolysis reactor is composed of an elementary cell as described above, with a cathode 2, an electrolyte 3, and an anode 4, and two monopolar connectors which perform electrical, hydraulic and thermal distribution functions.

To increase the flow of the resulting hydrogen and oxygen, there is a known way of stacking a plurality of elementary electrolysis cells on top of one another, separating them with interconnecting devices, usually called interconnectors or bipolar interconnecting plates. The assembly is positioned between two end interconnecting plates which support the power supplies and the gas supplies to the electrolyzer (electrolysis reactor).

A high temperature water electrolyzer (EHT) thus comprises at least one electrolysis cell, or usually a plurality of electrolysis cells stacked on one another, each elementary cell being formed by an electrolyte, a cathode and an anode, the electrolyte being intercalated between the anode and the cathode.

The fluid and electrical interconnection devices which are in electrical contact with one or both electrodes usually have the functions of supplying and collecting electric current, and delimit one or more gas flow compartments.

Thus, a compartment called a cathode compartment has the function of distributing electric current and water vapor, as well as of recovering hydrogen at the cathode in contact.

A compartment called an anode compartment has the function of distributing electric current and of recovering the oxygen produced at the anode in contact, using a drainage gas if necessary.

Figure 2:
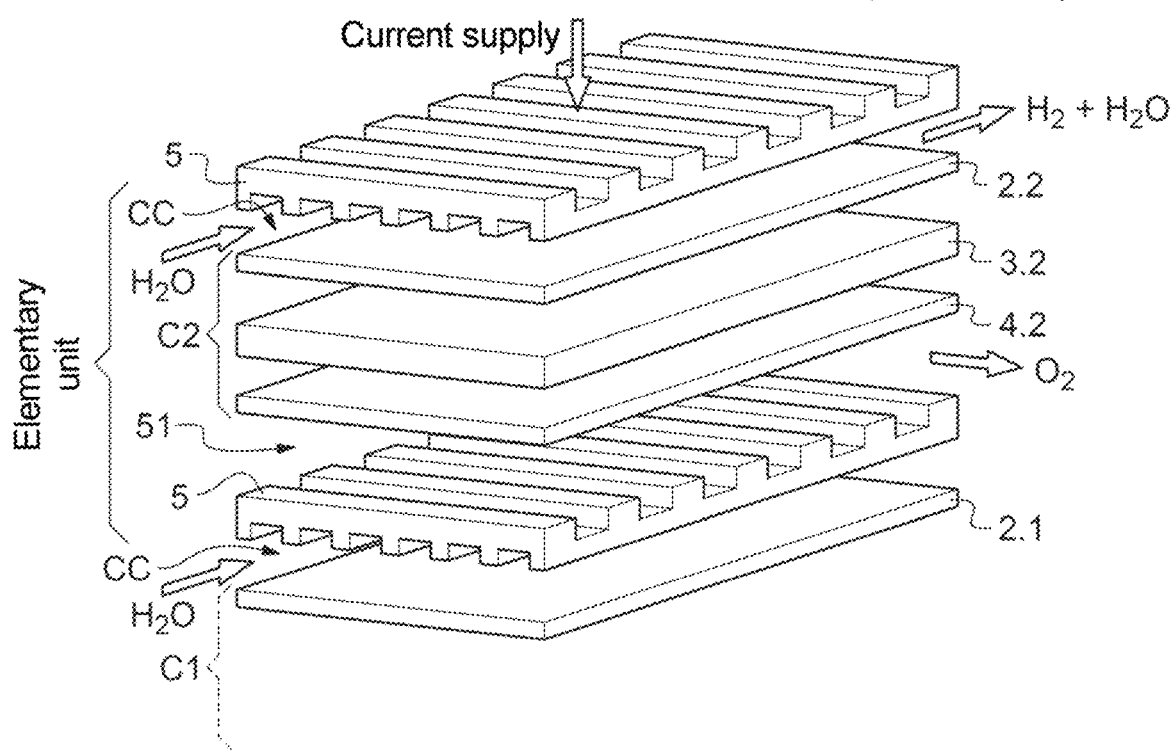

FIG. 2 shows an exploded view of elementary units of a high temperature water vapor electrolyzer according to the prior art. This EHT electrolyzer comprises a plurality of elementary electrolysis cells C1, C2 . . . of the solid oxide type (SOEC), stacked alternately with interconnectors 5. Each cell C1, C2 . . . consists of a cathode 2.1, 2.2, . . . and an anode 4.1, 4.2, between which an electrolyte 3.1, 3.2 . . . is placed. The assembly of electrolysis cells is supplied in series with the electric current and in parallel with the gases.

The interconnector 5 is a component made of metal alloy which provides the separation between the cathode CC and anode CA compartments, defined by the volumes between the interconnector 5 and the adjacent cathode 2.1, and between the interconnector 5 and the adjacent anode 4.2, respectively. It also has the role of distributing the gases to the cells. The injection of water vapor into each elementary unit takes place in the cathode compartment CC. The collection of the hydrogen produced and the residual water vapor at the cathode 2.1, 2.2 . . . takes place in the cathode compartment CC downstream of the cell C1, C2, after the dissociation of the water vapor by the cell. The collection of the oxygen produced at the anode 4.2 takes place in the anode compartment CA downstream of the cell C1, C2, after the dissociation of the water vapor into oxygen ions by the cell.

The interconnector 5 provides for the flow of current between the cells C1 and C2 by contact with the adjacent electrodes, that is to say between the anode 4.2 and the cathode 2.1.

In a solid oxide fuel cell SOFC according to the prior art, the cells C1, C2 . . . and interconnectors 5 used are the same components, but the operation is the reverse of that of an EHT electrolyzer as explained above, with a reversed current direction, with a supply of air to the compartments which then become cathode compartments, and hydrogen as fuel which is supplied to the compartments which, in turn, have become anode compartments.

The satisfactory operation of an EHT electrolyzer requires, among other things, the following essential functions:

A/ good electrical insulation between two adjacent interconnectors in the stack, to avoid short-circuiting the elementary electrolysis cell intercalated between the two interconnectors. This electrical insulation depends on the materials used for the various components facing one another, and also on the degree of clamping of the stack;

B/ good sealing between the two separate compartments, that is to say the anode and cathode compartments, to avoid the recombination of the gases produced, which would lead to reduced efficiency and, above all, the appearance of hot spots that would damage the electrolyzer; this implies seeking a complete initial voltage (or OCV, the English abbreviation for "Open Cell Voltage"). This sealing depends on the design of the gaskets and on the materials used for the various components facing one another, and also on the gas pressure acting on the gasket and the degree of clamping of the stack.

C/ good distribution of the gases, both at the inlet and during the recovery of the gases produced, to avoid a loss of efficiency, non-uniformity of pressure and temperature within the different elementary cells, or even unacceptable deterioration of the cells; this implies seeking the lowest polarization resistance.

The high temperatures considerably complicate the provision of the aforesaid three functions A/ to C/. Furthermore, because of the fragility of solid oxide cells, some constraining design rules are needed to ensure their mechanical integrity.

There are already various designs for providing the three essential functions A/ to C/ simultaneously, but various difficulties remain to be overcome.

In particular, as regards the provision of function B/, in view of the high ranges of operating temperature of EHT electrolyzers and SOFC fuel cells, typically from 600° C. to 1000° C., the sealing gaskets are conventionally based on glass or glass ceramic. A glass gasket is in a semi-solid state at the operating temperature.

In the design process, care must be taken not to expel the glass under the effect of a pressure difference applied to the gasket. As for a glass ceramic gasket, this is subjected to a heat cycle in situ with the aim of crystallizing it and thus making it solid at the operating temperature. As in the case of the glass gasket, care must be taken not to expel the glass ceramic before it solidifies.

The simplest configuration is that in which the gasket is placed between two dense planes, by contrast with the various porous materials present in an SOEC reactor or an SOFC fuel cell: the surface tension makes it possible to prevent its outflow up to a certain pressure difference between the sides of the gasket.

To favor this behavior, it is necessary to reduce the height of the gasket as far as possible, to increase the surface area of the parts in contact with the glass, and to reduce the pressure difference acting on the gasket.

The construction of this type of glass-based seal within SOEC reactors or SOFC cells encounters a number of problems. Firstly, the electrodes on either side of the cell are porous, and therefore cannot provide a simple support for a glass-based gasket. Moreover, there must be guaranteed electrical insulation between adjacent interconnectors, something that an excessively thin film of glass cannot provide without risk. Finally, these glasses have to be flattened to reduce their height, and also to provide an electrical contact between the cell and the interconnectors. This clamping must be done while avoiding any overhang of the cell, to preserve its mechanical integrity.

In view of the above, as already indicated, gaskets based on glass or glass ceramic intrinsically have the major disadvantage of withstanding only small pressure differences, of the order of a few hundred millibars.

The internal operation of an SOFC cell or an EHT reactor under pressure, typically at a pressure from several bars to several tens of bars, typically 30 bars, then requires a solution to avoid the loss of sealing at the gaskets.

There is a known solution consisting in placing the EHT stack reactor or SOFC cell within a sealed enclosure which is itself pressurized. Patent applications or patents FR 2957361A1, US2002/0081471 and U.S. Pat. No. 6,689,499 B2, which disclose this type of solution, may be cited here. This known solution has the advantage of enabling the same pressure to be established between the inside and the outside of the stack. This makes it possible to operate at high pressure, from several bars to several tens of bars, without any mechanical stress on glass or glass ceramic gaskets.

However, it also makes it necessary to guarantee the mechanical strength of an enclosure pressurized at these pressures, typically 30 bars, and containing a stack at a high temperature, typically 800° C., with hydrogen $H_2$ and oxygen $O_2$ flowing inside it. The management of the safety of this pressurized enclosure may not be a simple matter.

Additionally, the presence of the enclosure complicates the maintenance of the clamping of the stack, which ensures a good electrical contact between the interconnectors and the cells. In particular, the relocation of the clamping members to a relatively cold area is not simple.

Finally, the pressurized enclosure must be constructed with passages that are both penetrating and sealed, to allow for the supply and recovery of gas and electric current from the outside of the enclosure. Some of these passages must therefore be electrically insulating, while those containing water vapor must be temperature-controlled to avoid any surges of water vapor. In fact, if the temperature in the inlet and/or outlet pipes is not controlled, the water vapor continuously flowing inside may encounter a cold area, and then condense in an uncontrolled way. This creates surges that generate variations of gas and pressure supply.

The outcome of all these precautionary measures is a complete installation incorporating the pressurized sealed enclosure and the EHT reactor or the SOFC cell, which is complicated and costly.

To dispense with the need for the solution of using a pressurized sealed enclosure in which an EHT reactor or a SOFC cell is housed, the present applicant proposed, in patent application WO2016/096752A1, a module comprising a circuit for the flow of a gas additional to the reactive gases required for the electrolysis reaction or the reverse reaction in an SOFC cell, the circuit being adapted so that, during operation under pressure, this additional gas balances the pressure difference of the gases on either side of the glass- or glass ceramic-based sealing gaskets.

Figure 3:
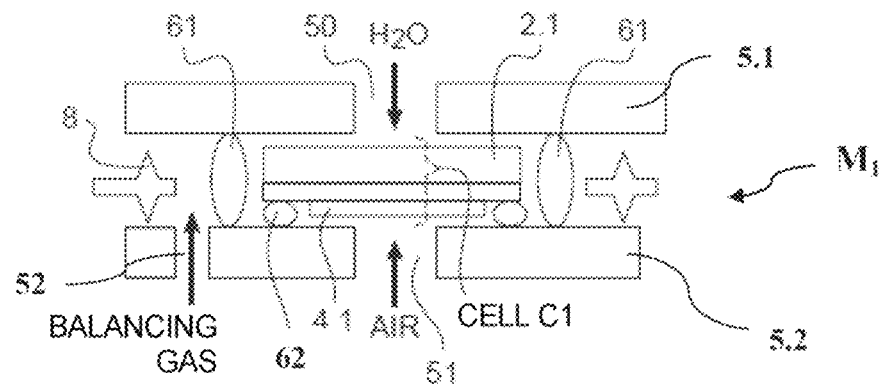

FIG. 3 reproduces a schematic sectional view of a module intended to form the elementary unit of an EHT water vapor electrolyzer according to the application WO2016/096752A1.

This module M1 comprises an elementary electrochemical cell (C1) having an axisymmetric shape around a central axis X, the cell being formed by a cathode, an anode, and an electrolyte intercalated between the cathode and the anode, and two electrical and fluid interconnectors 5.1, 5.2 on either side of the cell.

The two interconnectors 5.1 and 5.2 are each made of a single metal part, preferably of ferritic steel with a chromium content of about 20%, preferably CROFER® 22APU or F18TNb, or nickel-based, of the Inconel® 600 or Haynes 230® type.

The upper interconnector 5.1 is pierced by a water vapor supply conduit 50, opening on the central axis of the cell on the cathode side. The water vapor supplied and the hydrogen produced are distributed radially to a conduit for recovering the hydrogen produced, opening on the periphery of the cell on the cathode side.

The lower interconnector 5.2 is pierced by a conduit 51 for supplying drainage gas, such as air, opening on to the cell on the central axis on the anode side. Provision is also made for the supplied air and the oxygen produced to be radially distributed to a conduit for recovering the oxygen produced, opening on the periphery of the cell on the anode side.

A first sealing gasket 61 of axisymmetric shape about the central axis X is positioned at the periphery of the elementary cell C1, bearing against each of the two interconnectors simultaneously. This gasket is designed to provide a seal around the cathode compartment ($H_2O/H_2$).

A second sealing gasket 62 of axisymmetric shape about the central axis is positioned at the periphery of the anode of the elementary cell, bearing against the lower interconnector and the electrolyte simultaneously. This gasket is provided to create a seal around the anode compartment (air/$O_2$). The sealing gaskets 61 and 62 are glass- and/or glass ceramic-based.

An electrical insulation and sealing device 8 of axisymmetric shape about the central axis X is positioned at the periphery of the first sealing gasket around the cathode compartment. The device 8 may consist of a single electrically insulating washer forming a wedge seal, having two metal gaskets, bearing against the upper interconnector 5.1 and the lower interconnector 5.2 respectively.

The lower interconnector 5.2 is pierced by at least one conduit 58 for supplying the balancing gas, and at least one conduit for recovering this balancing gas, opening into the space delimited between the gasket 61 and the device 8 so as to provide a uniform distribution of the balancing gas for the purpose of balancing the pressures on either side of the first sealing gasket 61 during operation.

The device 8 is adapted to withstand a large pressure difference between the pressure of the balancing gas, which is supplied at the level that is as close as possible to the operating pressure of the EHT reactor, typically 10 to 30 bars, and the pressure outside the module, typically 1 bar. The insulating and sealing device 8 makes it possible to prevent any short circuit between the lower interconnector 5.2 and the upper interconnector 5.1.

Additionally, as mentioned above, relocating the clamping members of the stack of an SOEC reactor or of a fuel cell to a cold area has a number of major drawbacks.

To overcome these drawbacks, the applicant has proposed a solution for clamping without relocation to a cold area, which is described and claimed in the patent application filed on 15 Dec. 2015 under the number FR 1562384 and entitled "Stand-alone system for clamping a high-temperature SOEC/SOFC solid oxide stack".

Figure 4:
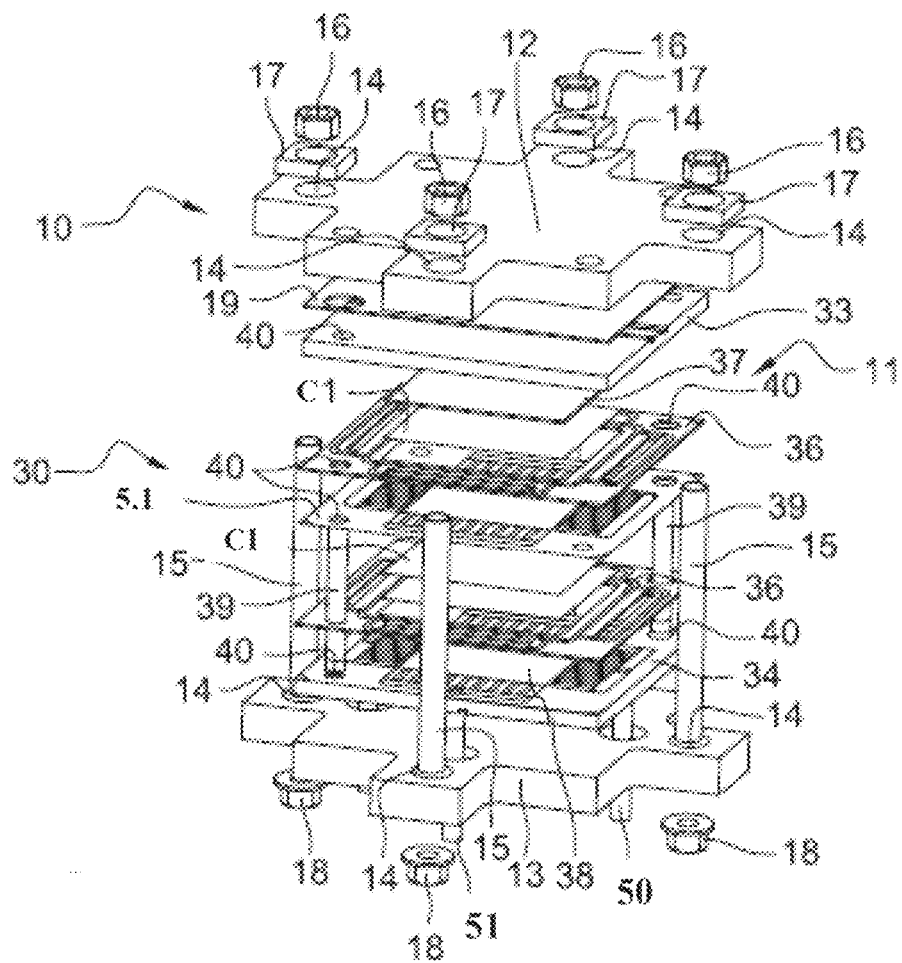

FIG. 4 is a reproduction of a partial exploded perspective view of an example of an assembly 30 comprising a high temperature SOEC/SOFC solid oxide stack 11 and a stand-alone clamping system 10 for this stack 11 according to the aforementioned application FR1562384.

The clamping system 10 comprises, firstly, an upper clamping plate 12 and a lower clamping plate 13, between which an SOEC/SOFC solid oxide stack 11 is clamped. The SOEC/SOFC solid oxide stack 11 comprises a plurality of electrochemical cells C1, each formed by a cathode, an anode, and an electrolyte intercalated between the cathode and the anode, and a plurality of intermediate interconnectors 5, each positioned between two adjacent electrochemical cells C1.

Each of the upper 12 and lower 13 clamping plates comprises a plurality of clamping apertures 14.

The clamping system 10 also comprises threaded bolts, which are four in number in the illustrated example. Each bolt comprises threaded clamping shank 15 extending through a clamping aperture 14 of the upper clamping plate 12 and through a corresponding clamping aperture 14 in the lower clamping plate 13, to enable the upper 12 and lower 13 clamping plates to be assembled together.

A first clamping nut 16, associated with a clamping washer 17, interacts with each corresponding clamping shank 15 inserted through one of the clamping apertures 14 in the upper clamping plate 12.

A second clamping nut 18 interacts with each corresponding clamping shank 15 inserted through the clamping apertures 14 in the lower clamping plate 13.

The components of the clamping bolts (the shanks 15 and nuts 16, 18) are advantageously made of nickel-based superalloy of the Inconel 625 type. This material can provide elastic behavior and thus prevent any creep or relaxation, in spite of the temperature levels envisaged.

For their part, the clamping washers 17 are made of AISI 310 refractory austenitic steel. The thickness of the clamping washers 17 may be adjusted according to the number of electrochemical cells C1 present in the SOEC/SOFC solid oxide stack 11.

The clamping system 10 thus defined can compensate for the difference in expansion between the Inconel 625 nickel-based superalloy clamping shanks 15 and the SOEC/SOFC solid oxide stack 11 by the high level of expansion of the lower 12 and upper 13 clamping plates and the clamping washers 17 made of AISI 310 refractory austenitic steel.

The clamping system 10 further comprises an electrical insulation plate 19, preferably made of mica, between the SOEC/SOFC solid oxide stack 11 and the upper clamping plate 12.

This plate 19 acts as an electrical insulation wedge between the SOEC/SOFC solid oxide stack 11 and the upper clamping plate 12. In the absence of this plate, since the clamping system 10 is made of metal, it would create a short circuit between the top and bottom of the stack 11.

The stack 11 further comprises an upper terminal plate 33 and a lower terminal plate 34, between which the plurality of electrochemical cells C1 and the plurality of interconnectors 5 are clamped.

The upper terminal plate 33 is in contact with the electrical insulation plate 19 of the clamping system 10, while the lower terminal plate 34 is in contact with the lower clamping plate 13 of the clamping system 10.

Each lower terminal plate 34 also has four metal tubes 50, 51 for the inlet and outlet of the gases produced.

An electrically insulating frame 36, preferably made of mica, is also placed around each electrochemical cell C1 and between two adjacent interconnectors 5. This insulating frame 36 enables each electrochemical cell C1 to be centered, and provides electrical insulation between the interconnectors 5.

Each insulating frame 36 can also act as a support for sealing gaskets which are, notably, made of glass and/or glass ceramic.

The SOEC/SOFC solid oxide stack 11 may also comprise a first contact layer 37 between each cathode in an SOEC, or each anode in an SOFC, of the electrochemical cells C1 and each intermediate interconnector 5 or upper terminal plate 33, and a second contact layer 38 between each anode in an SOEC, or each cathode in an SOFC, of the electrochemical cells C1 and each interconnector 5 or lower terminal plate 34.

These contact layers 37, 38 can improve the flow of electric current between the interconnectors 5 and the electrochemical cells C1.

The first contact layer 37 is preferably a nickel mesh, while the second contact layer 38 is a ceramic layer of lanthanum strontium manganite (or "LSM", for "Lanthanum Strontium Manganite" in English).

Finally, two guide columns 39 may be provided, extending through guide apertures 40 formed in the upper terminal plate 33, the lower terminal plate 34, the interconnectors 5, the insulating frames 36 and the upper clamping plate 12. These guide columns 39 provide guidance for the flattening of the SOEC/SOFC solid oxide stack 11 by compression while it is being clamped.

Additionally, all the steel materials used in the stack 11 are ferritic steels, notably of the Crofer, AISI 441 and/or AISI 430 type.

For information only, the order of magnitude of the average coefficients of expansion $\alpha$ used between 20° C. and 800° C. is as follows for the various materials mentioned above, namely:

ferritic steel: $\alpha=12.10^-$,
nickel and Inconel 625 mesh: $\alpha=16.10^{-6}$,
AISI 310 austenitic steel: $\alpha=18.10^{-6}$, and
strontium lanthanum manganite (LSM): $\alpha=12.10^{-6}$.

Depending on the respective thicknesses of each of the components of the stack 11, the thickness of the AISI 310 steel clamping washers 17 is selected so as to ensure that the total expansion of the parts located between the clamping nuts 16 and 18, corresponding to the sum of the products ($\alpha \times$thickness) for each component is equal to or slightly greater than the expansion of the threaded clamping shanks 15. This ensures that the initial clamping is maintained regardless of the temperature variation, or may even create slight over-clamping when the temperature rises from 20° C. to 800° C. Thus for a conclusive test result de test of an assembly 30 in terms of electrical contact and sealing, the AISI 310 clamping washers 17 have a thickness of approximately 10 mm when the number of electrochemical cells C1 is 25.

The clamping system 10 described above is not completely satisfactory in all the operating configurations of an SOEC reactor or SOFC fuel cell under pressure.

This is because, for operation under pressure, this clamping system will be subject to the effect usually known as a bottom effect, which is proportional to the pressure.

This is because, when it is desired to make the SOEC/SOFC stack operate with one or more of the reactive gases under pressure, the pressure of said stack must be raised. This pressure rise is manifested by a thrust or traction on the ends of the clamping bolts.

To compensate for this thrust, therefore, it would be necessary to carry out a progressive reclamping of the fittings, to compress this bottom effect.

Given that, by definition, the SOEC reactor or the SOFC fuel cell operates at a high temperature, typically between 600° C. and 1000° C., it is not feasible to carry out this reclamping in situ.

Consequently there is a need to offer an effective solution for clamping a stack of an SOEC electrolysis reactor or SOFC fuel cell designed to operate with the reactive gases under pressure, without using a pressurized sealed enclosure, notably in order to obviate the progressive reclamping of the clamping fittings which is required by the bottom effect due to the pressure rise of the stack.

In general terms, there is a need to offer an effective solution for (re)clamping a stack of an SOEC electrolysis reactor or of an SOFC fuel cell, regardless of high temperatures, and regardless of whether the stack is operating under pressure or without pressure, that is to say at atmospheric pressure.

One object of the invention is to provide at least a partial response to this need or these needs.

SUMMARY OF THE INVENTION

For this purpose, the invention relates to an electrochemical device, forming an SOEC electrolysis or co-electrolysis reactor or an SOFC fuel cell, designed to operate at high temperatures, comprising:

a stack of electrochemical cells based on SOEC/SOFC solid oxides, each cell being formed by a cathode, an anode, and an electrolyte intercalated between the cathode and the anode;

two end plates, called terminal plates, between which the stack is placed;

two clamping plates of the stack, between which the end plates and the stack are placed;

clamping means between the clamping plates, the clamping means being adapted to clamp the stack and keep it clamped between the terminal plates, regardless of the temperature, between the ambient temperature and the high operating temperatures of the device;

a clamping chamber delimited between one of the terminal plates and the adjacent clamping plate, the clamping chamber being connected to a clamping gas circuit at a higher pressure than the inside of the stack.

The clamping gas circuit may be independent of the reactive gas circuits within the stack: the chamber may therefore be supplied with a clamping gas independently of the stack.

Thus, according to a first variant, the clamping gas circuit does not pass through the stack.

According to this first variant, the clamping gas circuit advantageously comprises two opening conduits formed through the thickness of the terminal plate delimiting the clamping chamber. Thus, the clamping gas is supplied to the clamping chamber through one of the conduits and is discharged from the chamber through the other of the conduits.

According to a second variant, the clamping gas circuit passes through the stack.

The clamping chamber may advantageously be formed between the stack and the upper clamping plate, thus avoiding any passage of tubes in the lower part of the stack.

According to a first alternative embodiment of an SOEC electrolysis or co-electrolysis reactor, the stack is a stack of elementary units, each elementary unit comprising:
an elementary solid oxide electrochemical cell,
a first and a second device, each forming an electrical and fluid interconnector, each consisting of a component of electronically conductive, gas-tight material, the first and second interconnectors being placed on either side of the elementary cell, the first interconnector being pierced by a water vapor supply conduit opening into the cell on the cathode side, and by a conduit for recovering the hydrogen produced, opening on the periphery of the cell on the cathode side, so as to provide uniform distribution of the water vapor supplied and the hydrogen produced, respectively, from the supply conduit to the recovery conduit; the second interconnector being pierced by a conduit for recovering the oxygen produced, opening on the periphery of the cell on the anode side, so as to provide uniform distribution of the oxygen produced to the recovery conduit;
a first sealing gasket placed on the periphery of the elementary cell, bearing against the first interconnector and the second interconnector simultaneously;
a second sealing gasket placed on the periphery of the anode of the elementary cell, bearing against the second interconnector and the electrolyte simultaneously; the first and second sealing gaskets being glass- and/or glass ceramic-based;
an insulating and sealing device placed on the periphery of the first sealing gasket and bearing against the first and the second interconnector respectively;
at least one supply conduit and at least one recovery conduit for the clamping gas, formed in the first and second interconnectors, each opening into the space delimited between the first gasket and the insulating and sealing device so as to provide uniform distribution of the clamping gas from its supply conduit to its recovery conduit, the clamping gas thus also forming a balancing gas for balancing the pressures on either side of the first sealing gasket during the pressurized operation of the reactor;
the supply and recovery conduits of the clamping and balancing gas circuit opening into the clamping chamber.

According to a variant, the second interconnector is pierced by a conduit for supplying drainage gas such as air to the cell on the anode side, so as to provide a uniform distribution of the supplied drainage gas and of the oxygen produced, respectively, from the supply conduit to the recovery conduit.

According to a second alternative embodiment, the invention also relates to SOFC fuel cell, in which the stack is a stack of elementary units, each elementary unit comprising:
an elementary solid oxide electrochemical cell,
a first and a second device, each forming an electrical and fluid interconnector, each consisting of a component of electronically conductive, gas-tight material, the first and second interconnectors being placed on either side of the elementary cell, the first interconnector being pierced by a fuel supply conduit opening into the cell on the SOFC anode side, and by a conduit for recovering the water produced, on the periphery of the cell on the anode side, so as to provide uniform distribution of the fuel supplied and the water produced, respectively, from the supply conduit to the recovery conduit; the second interconnector being pierced by a conduit for supplying air or oxygen, opening on the periphery of the cell on the cathode side, so as to provide uniform distribution of the air or oxygen from the supply conduit to the recovery conduit;
a first sealing gasket placed on the periphery of the elementary cell, bearing against the first interconnector and the second interconnector simultaneously;
a second sealing gasket placed on the periphery of the SOFC cathode of the elementary cell, bearing against the second interconnector and the electrolyte simultaneously, the first and second sealing gaskets being glass- and/or glass ceramic-based;
an insulating and sealing device placed on the periphery of the first sealing gasket and bearing against the first and the second interconnector respectively;
at least one supply conduit and at least one recovery conduit for the clamping gas, formed in the first and second interconnectors, each opening into the space delimited between the first gasket and the insulating and sealing device so as to provide uniform distribution of the clamping gas from its supply conduit to its recovery conduit, the clamping gas thus also forming a balancing gas for balancing the pressures on either side of the first sealing gasket during the pressurized operation of the reactor;
the supply and recovery conduits of the clamping and balancing gas circuit opening into the clamping chamber.

For operation under pressure, the general shape of the stack, of the end plates and of the clamping chamber is preferably axisymmetric. A generally oval shape would also be feasible.

The clamping chamber may advantageously be delimited above the stack, between the upper terminal plate and the clamping plate, and more precisely between the upper terminal plate and the electrical insulation plate placed under the upper clamping plate.

According to an advantageous embodiment, the clamping chamber is delimited by the top of the upper terminal plate forming the bottom, by a solid plate forming the cover, and by a ring forming the side wall, the bottom, cover and side wall of the chamber being assembled to one another by welding. The cover and the side wall may each consist of thin sheet metal having a thickness which is advantageously between 0.1 and 0.5 mm, or preferably equal to 0.2 mm.

Thus the invention essentially consists in forming, above the clamping fittings, a clamping chamber in which a gas other than the reactive gases will flow, substantially at the same pressure as the reactive gases in the stack. The pressure of the gas flowing in the clamping chamber above the stack of elementary units will then balance the pressure created by the reactive gases and the gases produced within the stack.

This flow of pressurized gas within the clamping chamber will then passively compensate for the bottom effect due to the thrust exerted by the pressurized reactive gases and gases produced within the stack.

This pressure compensating clamping chamber makes it unnecessary to reclamp the clamping fittings during the pressure rise, such reclamping being impossible in situ in any case, due to the high operating temperatures of the SOEC reactor or the SOFC fuel cell, typically between 600° C. and 1000° C.

The initial clamping of the fittings of the clamping fittings, that is to say before the rise in pressure of the stack, may thus be that which is conventionally used for a stack operating without pressure, typically about 200 kg applied to the set of clamping shanks for a stack with an active surface area of 100 cm$^2$ in an elementary electrochemical cell.

However, care should be taken to ensure that the design of the fittings guarantees their mechanical strength when subject to the action of the pressure within the clamping chamber, typically of the order of 2 tons for a stack operating at 10 bars.

Thus the clamping fittings prevent the untimely opening of the stack, thereby ensuring safe operation and allowing clamping by compression of each cell between adjacent interconnectors. The clamping, which ensures sealing and electrical contact, is also provided by applying a suitable compressive force from one interconnector to the other. The chains of dimensions of all the components of the reactor or cell are determined to ensure the flattening of the sealing gaskets at the periphery, and of the electrical contact layers if appropriate. Typically, the flattening provided by clamping is several tens of microns.

The bolts are easy to use and reliable, in order to ensure the requisite safety, that is to say the prevention of the opening of the stack during operation in case of excess pressure.

Additionally, according to an additional aspect of the invention, the circulating gas is a clamping gas that may also act as a balancing gas, making it possible to dispense with a known solution that entails using a pressurized sealed enclosure inside which the EHT reactor or the SOEFC cell is housed. The volume of gas to be compressed is also much lower than in the case of an enclosure, resulting in greater energy efficiency and enhanced safety under pressure.

Thus only the circuit for the circulation of the balancing gas at the upper end of the stack is modified, the gas being made to flow in a loop inside the clamping chamber according to the invention.

This provides an easily constructed clamping chamber, supplied directly with the balancing gas which circulates over the height of the stack from bottom to top and is then recompressed at the outlet of the clamping chamber, to be recirculated from the top to the bottom of the stack.

Thus, to some extent, a new clamping function is given to the balancing gas, which retains its primary function of controlling the pressure difference between the inside and the outside of an EHT reactor or an SOFC fuel cell, thus permitting reliable operation under pressure.

The clamping gas may also make it possible to burn leakages of reactive gases or gases resulting from the reaction. It may advantageously be air. This circuit then allows the detection of the presence of fuel by analyzing a circuit which is of low volume in relation to the requirements of safety ventilation around the installation. This will simply make the detection of leaks of fuel, notably hydrogen, faster and more reliable.

In the pressurized operating mode, the only seal that has to withstand the pressure difference between the inside, typically between 10 and 30 bars, and the outside, typically 1 bar, while being an electrical insulator is that formed by the sealing and insulating device outside the circulation of the balancing gas, the stresses acting on this seal being greater than those between the anode and cathode compartments in which the reactive gases circulate.

In the nominal operating mode of an EHT reactor or an SOFC cell, the selected balancing and clamping gas is preferably air, making it possible to burn any minor leaks of hydrogen (less than a few percent of the output of the cells) from the first sealing gasket.

This selected balancing gas is hydrogen $H_2$ and/or water vapor $H_2O$ and/or a fuel, if the seal between the stack and the exterior is retained, but the seal of the first gasket is lost.

Finally, the clamping and balancing gas may be an inert gas with a high flow rate, in order to maintain the pressure if there is a simultaneous loss of the seal of the first gasket and of the seal between the device and the exterior.

In addition, the balancing and clamping gas may advantageously play a part in the thermal control of an EHT reactor or an SOFC fuel cell. In particular, if the clamping gas is air, it may be advantageous to use the outlet of the clamping chamber to supply the SOEC anode compartment. The passage into the clamping circuit provides pre-heating.

The clamping gas which may enable the stack to be reclamped during its operation also serves to ventilate the stack to some extent, by surrounding it with a curtain of clamping gas that may burn leaks of reactive gases or gases resulting from the reaction, or to make the fluid environment around the stack inert, by using nitrogen for example.

Each sealing device advantageously consists of an insulating washer and of third and fourth metal gaskets on either side of the insulating washer. It may also consist of an insulating washer brazed onto the interconnectors.

The clamping means may comprise two clamping bolts placed so that they pass through the clamping plates.

According to an advantageous embodiment, each clamping bolt comprises:
  a threaded clamping shank,
  a first clamping nut associated with a first clamping washer, both of which are designed to interact by screwing with the threaded clamping shank inserted through a clamping aperture in the upper clamping plate, the first clamping washer being placed between the first clamping nut and the upper clamping plate;
  a second clamping nut associated with a second clamping washer, both of which are designed to interact by screwing with the threaded clamping shank inserted through a clamping aperture in the lower clamping plate, the second clamping washer being placed between the second clamping nut and the lower clamping plate.

It is also possible to provide an electrically insulating tube placed between the clamping shank and the clamping aperture of the lower clamping plate, the second clamping washer also being electrically insulating.

The invention also relates to an operating method of an SOEC reactor according to the first alternative, according to which:

the supply conduits are supplied with water vapor or with a mixture of water vapor and another gas selected from carbon dioxide and nitrogen dioxide, and the supply conduits are simultaneously supplied with clamping and balancing gas, the pressure of the water vapor or of the mixture supplied being substantially equal to that of the clamping and balancing gas;

the hydrogen, or the hydrogen and carbon monoxide or nitrogen monoxide, produced by electrolysis or co-electrolysis of the water vapor is recovered, and at the same time the balancing gas that has circulated in the clamping chamber is recovered, in their respective recovery conduits.

According to a variant, the supply conduits are supplied with drainage gas such as air, the pressure of the drainage gas supplied being substantially equal to that of the clamping and balancing gas, and the oxygen produced is recovered.

The invention also relates to an operating method of an SOFC fuel cell according to the second alternative, according to which:

the supply conduits are supplied with fuel such as hydrogen or methane, and the supply conduits are supplied simultaneously with clamping and balancing gas;

the supply conduits are supplied with air or oxygen, the pressure of the fuel and of the air or oxygen supplied being substantially equal to that of the clamping and balancing gas;

the surplus fuel, the clamping and balancing gas that has circulated in the clamping chamber, and the water produced, on the one hand, and the surplus air or oxygen, on the other hand, are recovered in their respective recovery conduits.

According to an advantageous control mode, the temperature of the clamping and balancing gas is raised or lowered in its supply conduits so as to raise or lower, respectively, the temperature of the stack.

Advantageously, during operation, the pressure of the clamping and balancing gas in its supply conduits is increased while the pressure of the reactive gases is maintained, the difference between the increased pressure of the clamping and balancing gas and the pressure of the reactive gases being equal to not more than 500 mbar, so as to provide reclamping of the stack in operation.

According to an advantageous variant, any presence of fuel leaks in the clamping and balancing circuit containing air is detected.

Preferably, the elementary electrochemical cells are of the cathode-supported type.

The expression "cathode-supported cell", here and in the context of the invention, is taken to stand for the definition that has been given in the field of high temperature water electrolysis (EHT), denoted by the abbreviation CSC, for "Cathode-Supported Cell", that is to say a cell in which the electrolyte and the oxygen electrode (the anode) are placed on the thicker hydrogen electrode (the cathode), which therefore acts as a support.

DETAILED DESCRIPTION

Other advantages and characteristics of the invention will be more readily apparent from a perusal of the detailed description of examples of embodiment of the invention, provided for guidance only and without limiting intent, with reference to the drawings below, in which:

FIG. 1 is a schematic view showing the operating principle of a high temperature water electrolyzer, FIG. 2 is a schematic, partially exploded view of a part of a high temperature water vapor electrolyzer (EHT) of the SOEC type comprising interconnectors according to the prior art, FIG. 3 is a schematic view in partial section of an EHT electrolyzer or of an SOFC fuel cell according to the prior art, showing the configuration of the seals and the electrical contacts within the stack.

Figure 5A:
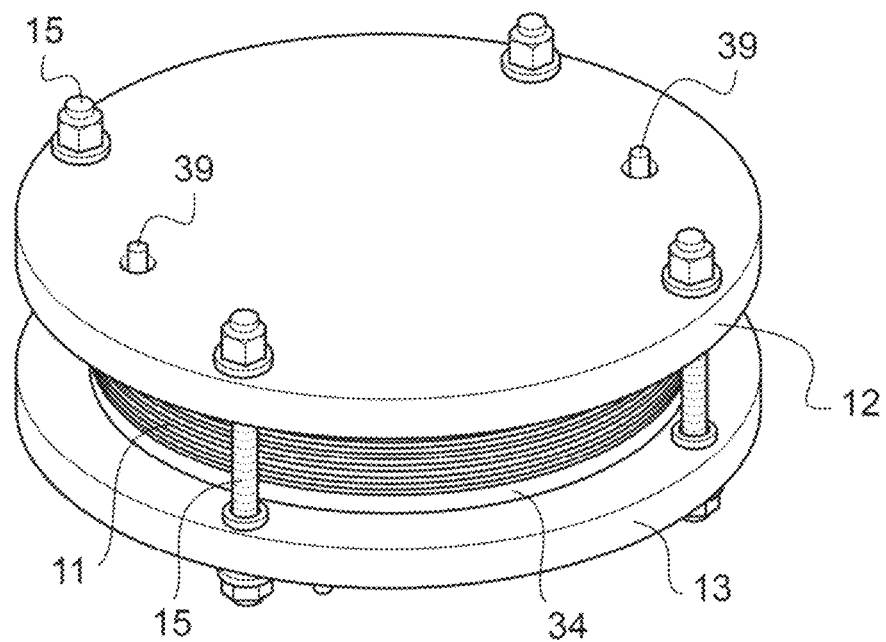
Figure 5B:
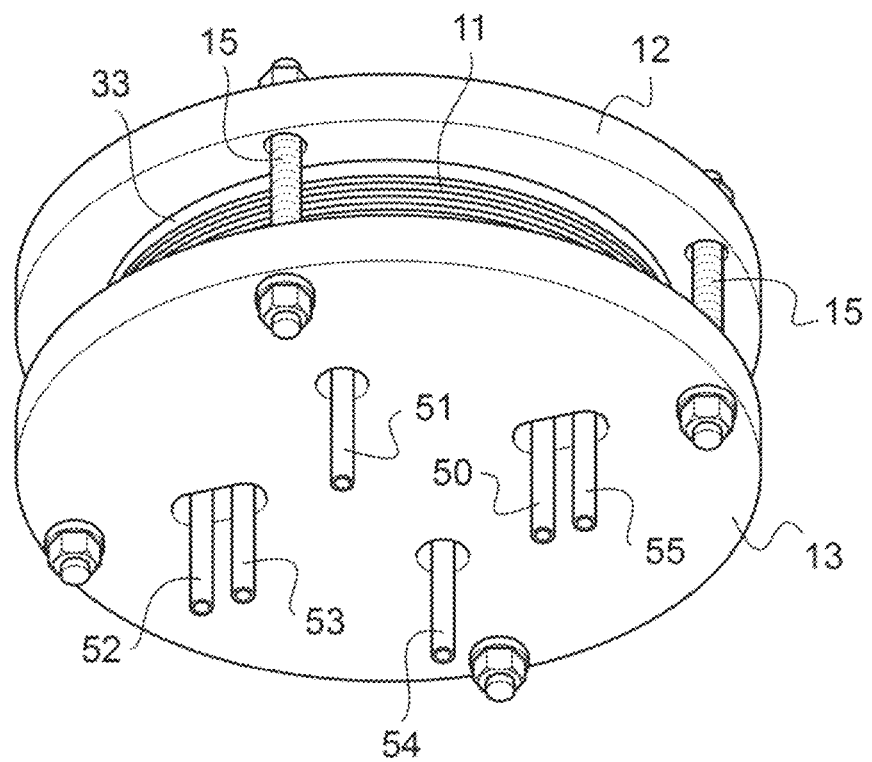
Figure 7B:
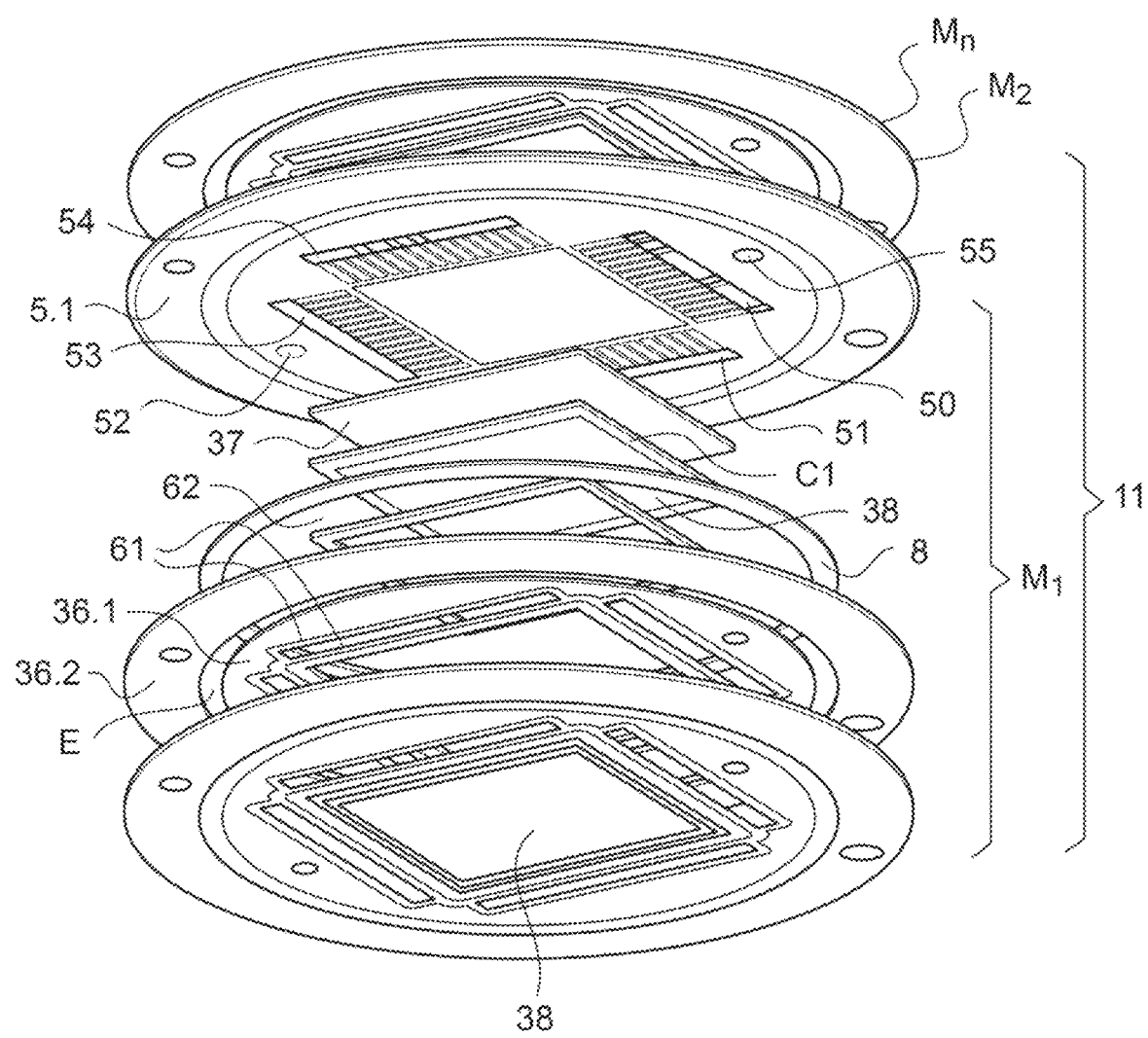
Figure 9:
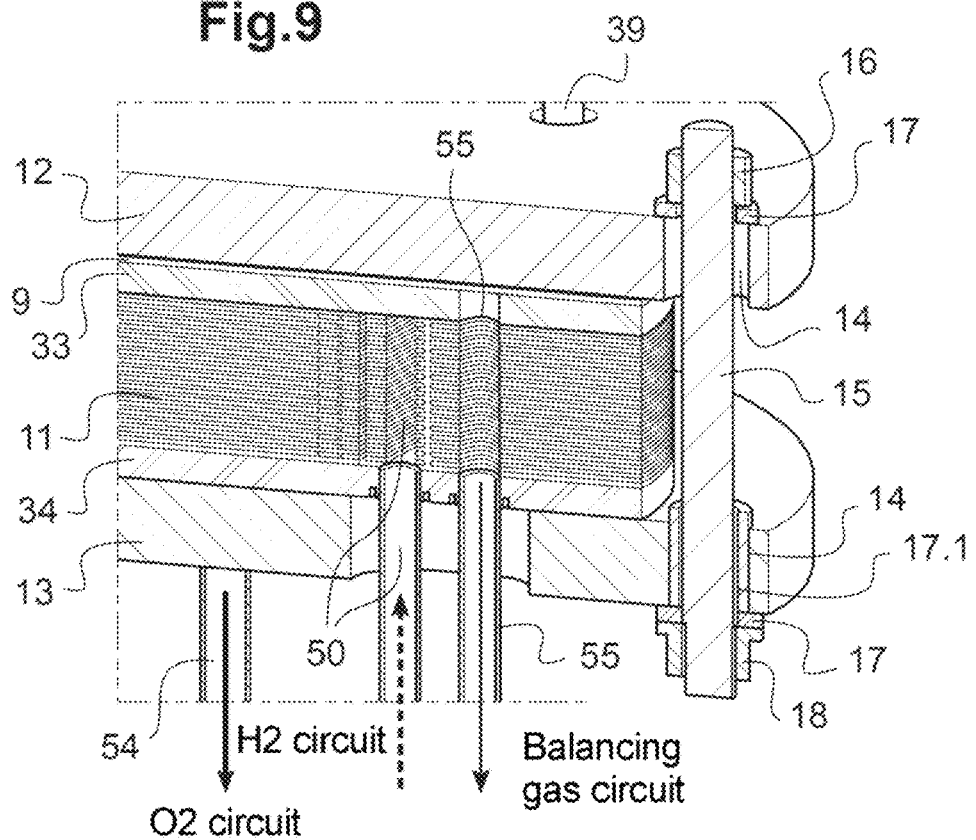
Figure 10:
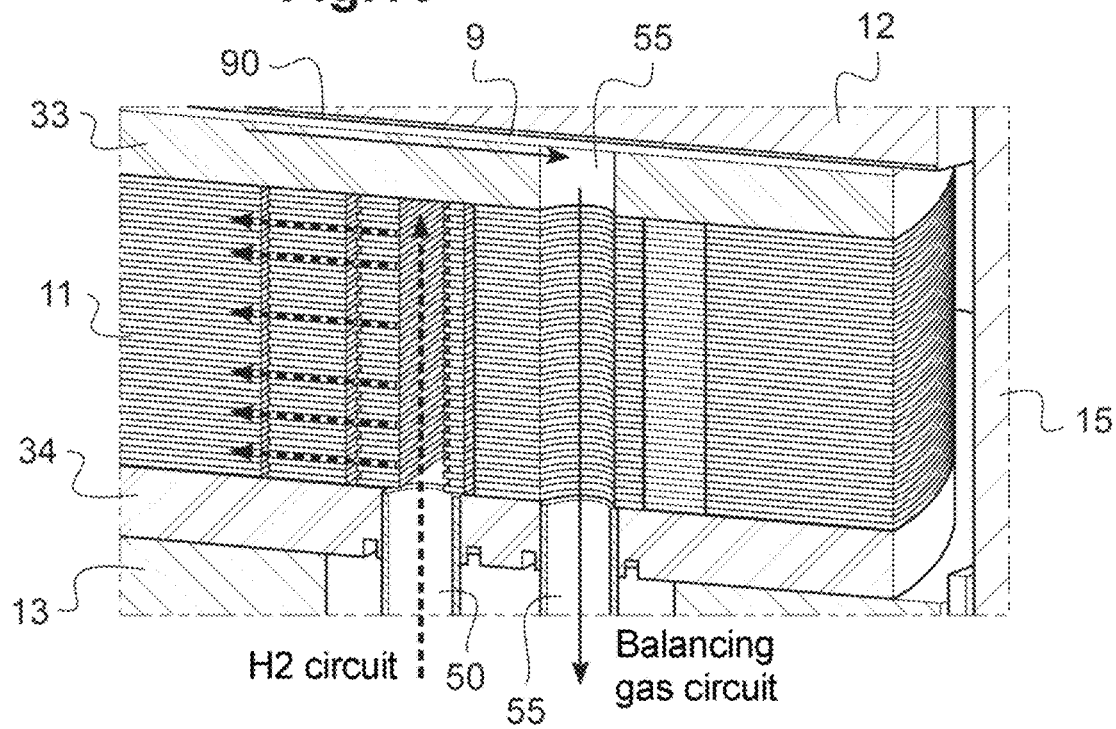
Figure 11A:
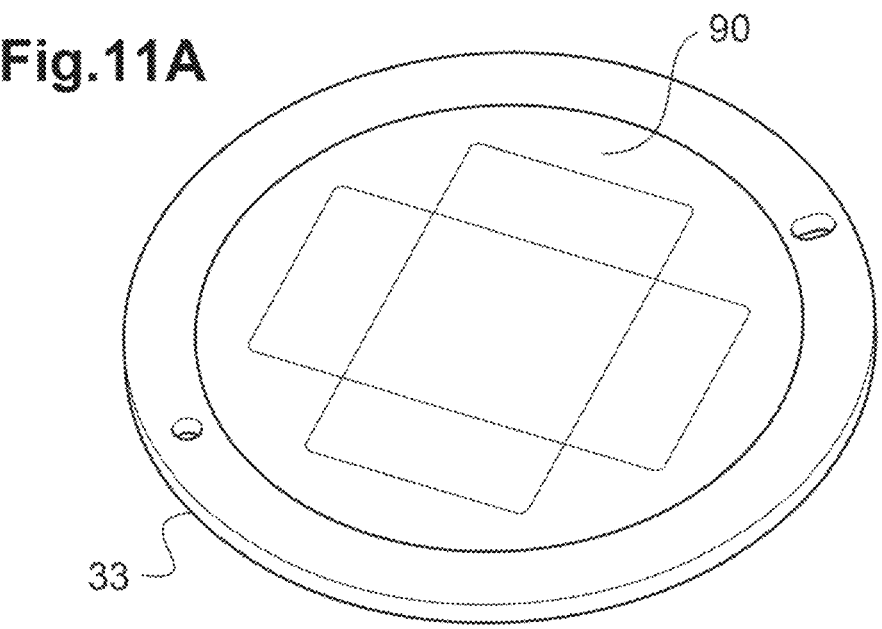
Figure 11B:
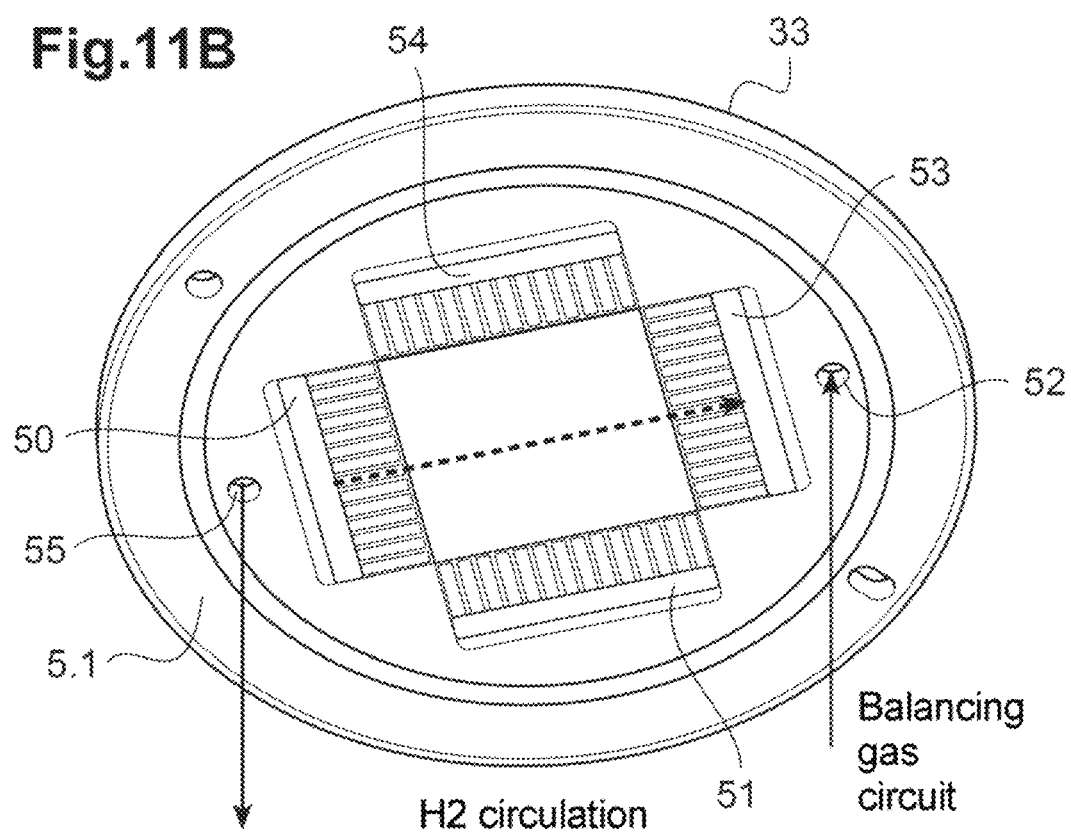
Figure 12:
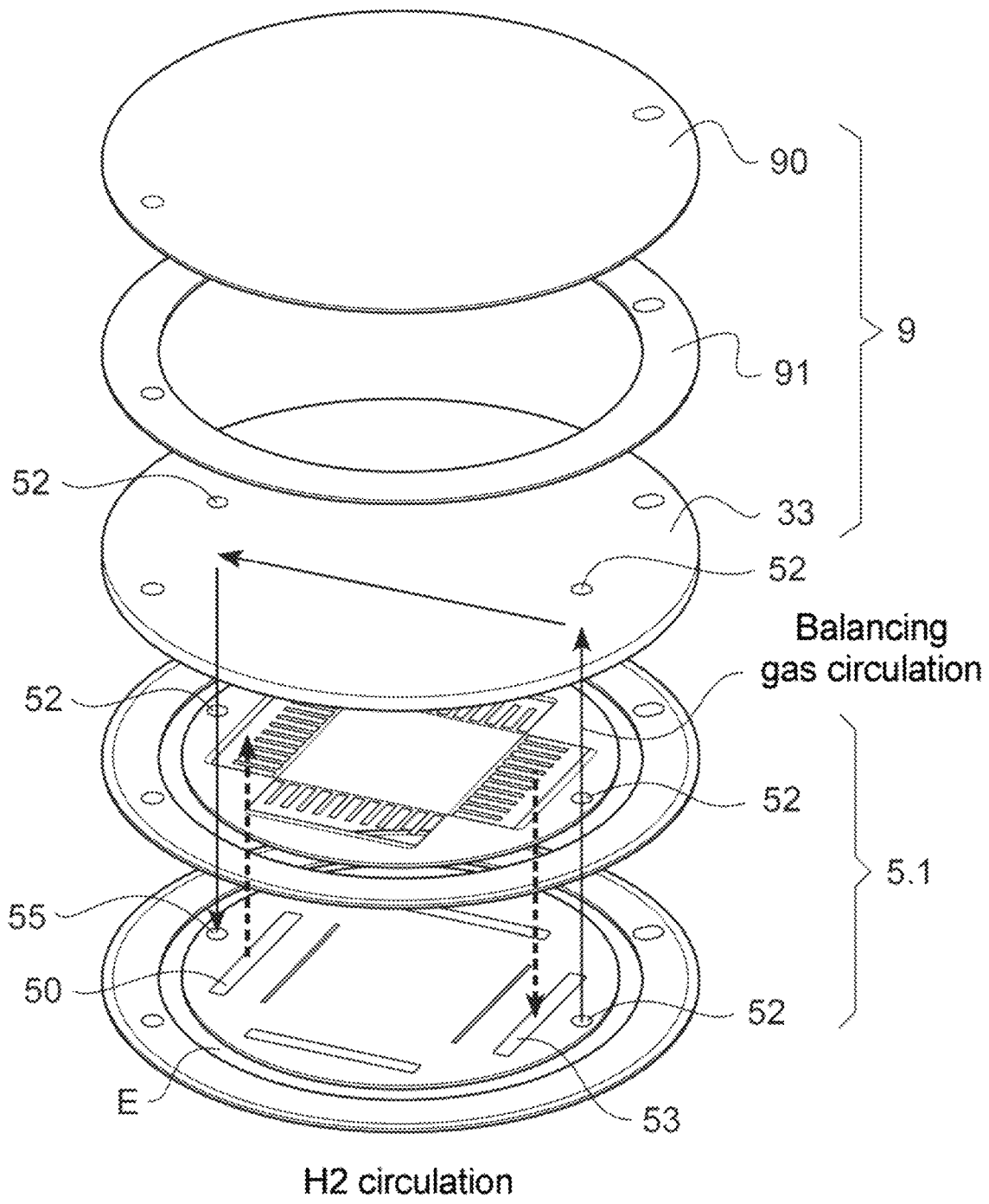

FIG. 4 is a schematic, partial exploded perspective view of an example of a high temperature SOEC/SOFC solid oxide stack reactor and a clamping system for this stack according to the prior art, FIGS. 5A and 5B are perspective views from the top and the bottom, respectively, of an SOEC reactor according to the invention, FIG. 6 is a partial exploded perspective view of the SOEC reactor according to the invention shown in FIGS. 5 and 6, FIGS. 7A and 7B are partial exploded perspective views from the top and the bottom, respectively, showing in greater detail an elementary electrolysis unit of a stack of the reactor according to the invention, FIGS. 8A and 8B correspond to FIGS. 7A and 7B, additionally showing the circulation of the reactive electrolysis gases and of the balancing gas, FIG. 9 is a view in partial longitudinal section of an SOEC reactor according to the invention, this FIG. 9 showing the exact circuits of the reactive gases and the balancing gas within the stack of elementary electrolysis units, FIG. 10 is an enlarged view of FIG. 9, this FIG. 10 showing the exact circuit of the balancing gas in the clamping chamber according to the invention, that is to say above the stack of elementary electrolysis units, FIGS. 11A and 11B are perspective views, from below and from above respectively, of the upper terminal plate, the top of which is enclosed by thin plates delimiting the clamping chamber according to the invention, inside which the balancing gas circulates, FIG. 12 is an exploded view, showing the composition of a clamping chamber according to the invention and the circulation of the balancing gas within it, FIG. 13 is an exploded view, showing the composition of a clamping chamber according to a variant of the invention and the circulation of the balancing gas within it, FIG. 14 is a schematic view, showing the pressure exerted on an SOEC/SOFC solid oxide stack by the gas within a clamping chamber according to the invention.

FIGS. 1 to 4, relating to the prior art, have already been discussed in the introduction. Consequently they are not detailed below.

For clarity, the same elements of an EHT electrolysis reactor according to the prior art and of an EHT electrolysis reactor according to the invention are denoted by the same reference numerals.

In all the figures, the symbols and arrows showing the supply of water vapor $H_2O$, the distribution and recovery of dihydrogen $H_2$, oxygen $O_2$, air and electric current, and of the balancing gas, are shown for the purposes of clarity and accuracy, to illustrate the operation of a high temperature electrolysis reactor.

It is specified here that, throughout the present application, the terms "lower", "upper", "top", "bottom", "inside", "outside", "internal" and "external" are to be interpreted with reference to a reactor according to the invention in a pressurized operating configuration, that is to say with the cells stacked vertically, the SOEC cathode being positioned above the anode in the configuration presented here.

It is also specified that the electrolyzers or fuel cells described here are of the solid oxide type (SOEC, an English abbreviation for "Solid Oxide Electrolyzer Cell", or SOFC, an English abbreviation for "Solid Oxide Fuel Cell"), operating at high temperature. Thus, all the constituent parts (anode/electrolyte/cathode) of an electrolysis cell or fuel cell are ceramics. The high operating temperature of an electrolyzer (electrolysis reactor) or a fuel cell is typically between 600° C. and 1000° C. Typically, the characteristics of an SOEC elementary electrolysis cell according to the invention, of the cathode-supported type (CSC), may be those shown in the table below.

TABLE

| Electrolysis cell | Unit | Value |
|---|---|---|
| Cathode 2 | | |
| Constituent material | | Ni-YSZ |
| Thickness | μm | 315 |
| Thermal conductivity | $W\ m^{-1}\ K^{-1}$ | 13.1 |
| Electrical conductivity | $\Omega^{-1}\ m^{-1}$ | $10^5$ |
| Porosity | | 0.37 |
| Permeability | $m^2$ | $10^{-13}$ |
| Tortuosity | | 4 |
| Current density | $A \cdot m^{-2}$ | 5300 |
| Anode 4 | | |
| Constituent material | | LSM |
| Thickness | μm | 20 |
| Thermal conductivity | $W\ m^{-1}\ K^{-1}$ | 9.6 |
| Electrical conductivity | $\Omega^{-1}\ m^{-1}$ | $1 \times 10^4$ |
| Porosity | | 0.37 |
| Permeability | $m^2$ | $10^{-13}$ |
| Tortuosity | | 4 |
| Current density | $A \cdot m^{-2}$ | 2000 |
| Electrolyte 3 | | |
| Constituent material | | YSZ |
| Thickness | μm | |
| Resistivity | $\Omega m$ | 0.42 |

Finally, again for the sake of clarity, a gas circulation conduit is designated by the same reference numeral, whether this relates to the part formed by a tube outside the stack or to the part formed by the stack of apertures pierced through the components.

Thus the water vapor supply conduit is designated by the reference 50 for both the external tube and the conduit inside the stack. The same applies to the drainage gas ($O_2$ or air) supply conduit 51, the balancing gas supply conduit 52, the conduit for recovering the hydrogen produced 53, the conduit for recovering the oxygen produced 54, and finally the balancing gas recovery conduit 55.

FIGS. 5A and 5B show a general view of an SOEC electrolysis reactor designed to operate under pressure.

As can be seen in the figures, the reactor comprises, firstly, an upper clamping plate 12 and a lower clamping plate 13, between which a stack 11 of elementary units, consisting of SOEC solid oxide cells and thick end plates 33, 34, is clamped.

More precisely, the two end plates or terminal plates 33, 34 frame the stack 11. In the illustrated example, the clamping plates 12, 13, the terminal plates 33, 34 and the stack 11 have an axisymmetric shape, favorable to operation under pressure, about a central axis X perpendicular to the plane of the cells.

The clamping is carried out by means of clamping bolts 15, 16, 17, 18, four in number, which are uniformly distributed in the illustrated example.

More precisely, each bolt comprises a threaded clamping shank 15, each extending through a clamping aperture 14 of the upper clamping plate 12 and through a corresponding clamping aperture 14 in the lower clamping plate 13, to enable the upper 12 and lower 13 clamping plates to be assembled together. Advantageously, the clamping shanks 15 may have a cylindrical shape with a diameter equal to or greater than 16 mm.

A first clamping nut 16, associated with a clamping washer 17, is provided at each clamping aperture 14 of the upper clamping plate 12, to interact by screwing with each corresponding clamping shank 15 inserted through the clamping aperture 14. The first clamping washer 17 is placed between the first clamping nut 16 and the upper clamping plate 12.

A second clamping nut 18, associated with a second clamping washer 17, Is provided for interacting by screwing with each threaded clamping shank 15 inserted through a clamping aperture 14 of the lower clamping plate 13. The second clamping washer 17 is placed between the second clamping nut 18 and the lower clamping plate 13. Additionally, as shown in FIG. 6, a tube 17.1 may be inserted between a threaded shank 15 and a corresponding clamping aperture 14 of the lower plate 13. This second washer 17 is electrically insulating, as is the tube 17.1, so that different electrical potentials are permitted between the upper clamping plate 12 and the lower clamping plate 13.

Advantageously, the upper 12 and lower 13 clamping plates are made of AISI 310 refractory austenitic steel, each having a thickness of about 25 mm.

Also, advantageously, the clamping shanks 15 and the first 16 and second 18 clamping nuts are advantageously made of nickel-based superalloy of the Inconel 625 type.

The upper clamping washers 17 are preferably made of AISI 310 refractory austenitic steel. The thickness of the clamping washers 17 may be adjusted according to the number of elementary units present in the stack 11 of solid oxide electrochemical cells. For reasons of electrical insulation, the lower clamping washers 17 are preferably made of zirconia or Macor®.

Various pipes are provided for supplying the reactive gases and the balancing gas through the stack and for recovering the gases produced by the water electrolysis at high temperature, typically between 600° C. and 1000° C., as well as the balancing gas, and extracting them from the stack. The flow rate and pressure of each gas may be controlled in its corresponding pipe.

Thus a pipe 50 enables the water vapor to be supplied through the stack to the various cathodes of the cells of the elementary units, the hydrogen produced and any remaining water vapor being recovered and extracted from the stack through the pipe 53.

Similarly, a pipe 51 enables a drainage gas, such as oxygen or air, to be supplied through the stack to the various anodes of the cells of the elementary units, the oxygen produced being recovered and extracted from the stack through the pipe 54.

Finally, a pipe 52 enables a balancing gas to be supplied through the stack and, as described below, into a clamping chamber 9 above the terminal plate 34, after which it is extracted through the pipe 55.

The construction of the interior of the electrolysis reactor is shown in FIG. 6, which provides an exploded view of an elementary unit $M_1$ of the stack 11 of n identical elementary units $M_1$ ... to Mn. An elementary unit M1 comprises an elementary electrochemical cell C1 intercalated between a first 5.1 and a second 5.2 electrical and fluid interconnector.

As shown in this FIG. 6, a plate of electrical insulation material 19 is placed between the upper clamping plate 12 and the upper terminal plate 33. This electrical insulation plate 19 is an electrical insulation wedge between the solid oxide stack 11 and the upper clamping plate 12. This electrical insulation plate 19 is advantageously made of mica.

The elementary unit $M_1$ is shown in greater detail in FIGS. 7A and 7B.

As may be seen in these figures, an elementary unit $M_1$ comprises a layer forming an insulating wedge in two parts 36.1, 36.2, which is placed around each electrochemical cell C1 and between two adjacent interconnectors.

The inner insulating wedge 36.1 enables each electrochemical cell C1 to be centered, and provides electrical insulation between the adjacent interconnectors. This wedge may also serve as a support for the sealing gaskets 61 as detailed below.

The inner insulating wedges 36.1 and 36.2 are preferably made of mica.

An elementary unit M1 further comprises a first contact layer 37 between the cathode of the cell C1 and each interconnector 5.1, or the upper terminal plate 33 in the case of the elementary unit Mn at the upper end of the stack 11, and comprises a second contact layer 38 between the anode of the cell C1 and each interconnector 5.2, or the lower terminal plate 34 in the case of the elementary unit M at the lower end of the stack 11.

These contact layers 37, 38 can advantageously improve the flow of electric current between the interconnectors 5.1, 5.2 and the electrochemical cells C1.

In the illustrated examples, the first contact layer 37 is advantageously formed by a nickel mesh, while the second contact layer 38 is a ceramic oxide layer of lanthanum strontium manganite (or "LSM", for "Lanthanum Strontium Manganite" in English).

As may be seen in FIG. 6, two guide columns 39 are provided, extending through guide apertures 40 formed in the upper terminal plate 33, the lower terminal plate 34, the interconnectors 5.1, 5.2, the insulating wedges 36.2 and the upper clamping plate 12. These guide columns 39, which are electrically insulating, being made of Macor® for example, provide guidance for the flattening of the stack 11 by compression during assembly when the reactor is clamped.

Each interconnector 5.1, 5.2 consists of three flat thin sheets, pierced with apertures and extending along two mutually orthogonal axes of symmetry, the flat sheets being layered and assembled to one another by welding. To gain a better understanding of the construction of the interconnectors 5.1, 5.2 in the form of three thin sheets, it would be advantageous to consult patent application FR 3040061A1.

The thin sheets are preferably made of steel, even more preferably of ferritic steel with a chromium content of about 20%, preferably CROFER® 22APU or F18TNb, or nickel-based steel of the Inconel® 600 or Haynes 230® type.

The layering and assembly of the thin sheets in these interconnectors 5.1, 5.2 is carried out in such a way that:
- a part of the water vapor supply conduit 50 and the conduit 53 for recovering the hydrogen produced is delimited by apertures formed in the sheets, which communicate with one another while allowing the supplied water vapor to circulate through each cathode to produce the hydrogen;
- a part of the drainage gas supply conduit 51 and the conduit 54 for recovering the oxygen produced is delimited by apertures formed in the sheets, which communicate with one another while allowing the drainage gas to circulate through each anode to produce the oxygen; the circulation at the anodes being in counterflow relative to that at the cathodes;
- a part of the balancing gas supply conduit 52 is delimited by apertures formed in the sheets, which communicate with one another while allowing the balancing gas to pass through the interconnectors 5.1, 5.2, without circulation at the cathodes and at the anodes;
- a part of the balancing gas recovery conduit 55 is delimited by apertures formed in the sheets, which communicate with one another while allowing the balancing gas to pass through the interconnectors 5.1, 5.2, without circulation at the cathodes and at the anodes.

A first sealing gasket 61 of axisymmetric shape about the central axis X is positioned on the periphery of the elementary cell C1, bearing against each of the two interconnectors 5.1, 5.2 simultaneously. This gasket 61 is designed to provide a seal around the cathode compartment. As shown, the first gasket 61 is formed on and under the inner insulating wedge 36.1.

A second sealing gasket 62 of axisymmetric shape about the central axis is placed on the periphery of the anode of each elementary cell C1, bearing against the lower interconnector 5.2 and the electrolyte simultaneously. This gasket is provided to create a seal around the anode compartment. The sealing gaskets 61 and 62 are glass- and/or glass ceramic-based.

An electrical insulation and sealing device 8 of axisymmetric shape about the central axis X is positioned on the periphery of the first sealing gasket 61 around the cathode compartment, and bears against the upper interconnector 5.1 and the lower interconnector 5.2 respectively.

More precisely, the device 8 is placed in an annular space E between the inner 36.1 and outer 36.2 insulating wedges, the inner wedge 36.1 carrying the sealing gasket 61. Corresponding annular spaces E may be formed in the upper 5.1 and lower 5.2 interconnector. Thus, as specified above, each interconnector 5.1, 5.2 consisting of three thin sheets, in order to delimit an annular space it is possible to make an annular cut-out in each of the two end sheets, but not in the central sheet. The annular spaces E formed simultaneously in the interconnectors 5.1, 5.2 and in the electrical insulation wedges enable the insulating device 8 to be positioned with centering.

The device 8 may advantageously consist of an electrically insulating washer forming a wedge, clamped by metal sealing gaskets which have no contact with one another. Each of these metal gaskets then bears against the upper interconnector 5.1 and the lower interconnector 5.2 respectively. The insulating washer may advantageously be made of zirconia, and the two metal gaskets may be based on an alloy comprising chromium and iron, for example Fecralloy®. This insulating washer may also be brazed onto the interconnectors.

As may be seen in the various figures, the supply conduit 52 and recovery conduit 55 for a balancing gas, formed in the interconnectors 5.1, 5.2 and the inner insulating wedge 36.1, each open into the space delimited between the first gasket 61 and the insulating and sealing device 8 so as to provide a uniform distribution of the balancing gas from its supply conduit to its recovery conduit. Thus, the pressures on either side of the first sealing gasket 61 are balanced during the operation of the reactor under pressure. Thus the device 8 is adapted to withstand a large pressure difference between the pressure of the balancing gas, which is supplied at the level that is as close as possible to the operating pressure of the EHT reactor, typically 10 to 30 bars, and the pressure outside the stack of modules, typically 1 bar.

The inventors have found that, when the reactor operates under pressure and with only the components of the stack 11, namely the proposed clamping plates 12, 13 and the clamping fittings 15, 16, 17, 18 as described above, a progressive reclamping of the fittings was required to keep the stack sealed and free of any loss of electrical contact between modules.

They then deduced that the cause of this reclamping was due to the bottom effect, that is to say the fluid thrust of the pressurized gases within the stack 11 on the upper end of the reactor, causing the elongation of the clamping shanks.

Thus, according to the invention, a flexible sealed clamping chamber 9 is provided, supplied with the balancing gas which has the advantage of being introduced into the reactor at a pressure substantially equal to that of the reactive gases which give rise to the bottom effect.

As shown in FIGS. 6, 9 and 10, the clamping chamber 9 according to the invention is delimited between the upper terminal plate 33 and the electrical insulation plate 19. It is sufficiently flexible to follow the elongation of the clamping shanks.

The supply 52 and recovery 55 conduits of the clamping and balancing gas circuit open into the clamping chamber 9. Thus the clamping and balancing gas is made to circulate in the clamping chamber 9 above the stack of elementary units, the pressure established in the chamber 9 then balancing the pressure due to the reactive gases and the gases produced within the stack 11. In other words, the circulation of the pressurized clamping and balancing gas within the clamping chamber passively compensates for the aforementioned bottom effect.

In the illustrated examples, the sealed clamping chamber 9 is delimited by the top of the upper terminal plate 33 forming the bottom, by a plate 90 forming the cover, and by a ring 91 forming the side wall. These different parts, that is to say the bottom 33, the cover 90 and the side wall 91 of the chamber, are assembled together by welding. This construction is highly advantageous, because it is flexible but very robust and compact, and has no effect on the design of the electrolysis reactor.

With the aforementioned preferred materials, the design of the clamping fittings 15, 16, 17, 18 enables them to have elastic behavior under the effect of the pressure within the clamping chamber 9, typically of the order of 2 tons for a stack 11 operating under a pressure of 10 bars, and can therefore prevent any creep or relaxation despite the expected temperature levels of between 20° C. and 1000° C., regardless of the differential expansion of each of the components of the reactor.

A description will now be given of the operation of an EHT electrolysis reactor comprising a plurality of modules according to the invention, which have been described with reference to FIGS. 5A to 12.

The tube 50 is supplied with water vapor, and therefore the water vapor supply conduits 50 within the stack are also supplied, and at the same time the tube 52 is supplied with clamping and balancing gas, and therefore the supply conduit 52 and the annular space are also supplied, the pressure of the water vapor supplied being substantially equal to that of the balancing gas.

Also at the same time, the tube 51 is supplied with air acting as the drainage gas, and therefore the supply conduit 51 is also supplied, the pressure of the air supplied being substantially equal to that of the balancing gas.

The water vapor distributed radially from the supply conduit 50 and the hydrogen produced by the electrolysis of the water vapor are recovered radially in the recovery conduit 53 and therefore through the recovery tube 53.

The clamping and balancing gas circulates in the space between the sealing gasket 61 and the device 8 over the whole height of the stack 11, until it reaches the clamping chamber 9 and is then recovered at the outlet of the latter into the recovery conduit 55 and therefore through the recovery tube 55. The pressure then established within the clamping chamber 9 compensates for the pressure exerted on the upper terminal plate 34 by the reactive gases and the gases produced within the stack.

The air distributed radially from the supply conduit 51 and the oxygen produced by the electrolysis of the water vapor are recovered through the recovery tube 54.

In some configurations, notably when it is desired to operate the SOEC stack 11 at atmospheric pressure only, it is possible to dispense with the construction of the balancing gas circuit within the stack, and to provide a clamping gas circuit that does not pass through the stack.

An embodiment of a clamping gas circuit independent of the stack is shown in FIG. 13. According to this embodiment, the clamping gas circuit comprises two opening conduits 330, pierced directly through the thickness of the terminal plate 33 delimiting the clamping chamber 9. Thus, the clamping gas directly supplies the clamping chamber 9, independently of the circulation of the gases within the stack 11. Thus, the clamping gas penetrates into the clamping chamber 9 through one of the conduits 330 and is then discharged from the outlet of the chamber 9 through the other of the conduits 330.

FIG. 14 shows in a schematic, indeed highly exaggerated manner, in the form of arrows, the pressure of the clamping gas P exerted inside the chamber 9 whose solid plate acts as a flexible elastic membrane.

Thus this gas pressure P inside the chamber 9 can compensate for, that is to say follow, the elongation undergone by the mechanical stays 15, 16, 17, 18 while the SOEC reactor with the stack 11 is operating under pressure. Thus the following of this elongation prevents the stack from opening under the internal pressure of the reactive gases.

Other variants and advantages of the invention may be provided without departure from the scope of the invention.

Although it has been described for high temperature water electrolysis, the reactor in the form of a stack of elementary units $M_1$ to Mn may be used equally well for co-electrolysis of water vapor mixed either with carbon dioxide or nitrogen dioxide, the balancing gas circulating in the same way under pressure in the clamping chamber 9.

Although it has been described for high temperature water electrolysis, the reactor in the form of a stack of elementary units $M_1$ to Mn may be used equally well as an SOFC fuel cell. In this case, the supply tubes 50 are supplied with fuel, for example hydrogen or methane, the tubes 52 are supplied with balancing gas, and the tubes 51 are supplied with air or oxygen. The balancing gas also circulates in the same way with a passage under pressure in the clamping chamber 9.

The illustrated clamping chamber 9 is constructed with an annular side wall 91 between the solid plate forming the cover 90 and the upper terminal plate 33 acting as the bottom. It is also possible to construct a clamping chamber 9 without using the annular wall 91 and by assembling the upper terminal plate 33 directly by peripheral welding with the solid plate 90, the latter again acting as a flexible elastic membrane under the gas pressure established inside the chamber.

The invention is not limited to the examples described above; notably, characteristics of the illustrated examples may be combined with one another in variants which are not illustrated.

The expression "including a" and the expression "comprising a" are to be understood as "including at least one" and "comprising at least one", respectively.

The invention claimed is:

1. An electrochemical device, forming an SOEC electrolysis or co-electrolysis reactor or an SOFC fuel cell, configured to operate at high temperature, comprising:
    a stack of electrochemical cells based on SOEC/SOFC solid oxides;
    two end plates, called terminal plates, between which the stack is placed;
    two clamping plates of the stack; between which the end plates and the stack are placed;
    clamping means between the clamping plates, the clamping means being adapted to clamp the stack and keep the stack clamped between the terminal plates, regardless of temperature between ambient temperature and high operating temperatures of the device; and
    a clamping chamber delimited between one of the terminal plates and an adjacent clamping plate, the clamping chamber being connected to a clamping gas circuit at a higher pressure than inside of the stack.

2. The SOEC electrolysis or co-electrolysis reactor or SOFC fuel cell according to claim 1, wherein the clamping gas circuit is independent of reactive gas circuits within the stack.

3. The SOEC electrolysis or co-electrolysis reactor or SOFC fuel cell according to claim 1, wherein the clamping gas circuit is not passing through the stack.

4. The SOEC electrolysis or co-electrolysis reactor or SOFC fuel cell according to claim 3, wherein the clamping gas circuit comprises two opening conduits, pierced directly through a thickness of the terminal plate delimiting the clamping chamber.

5. The SOFC fuel cell according to claim 4, wherein the stack is a stack of elementary units, each elementary unit comprising:
    an elementary electrolytic cell formed by a cathode, an anode, and an electrolyte intercalated between the cathode and the anode,
    a first and a second device, each forming an electrical and fluid interconnector, each consisting of a component of electronically conductive, gas-tight material, the first and second interconnectors being placed on either side of the elementary cell, the first interconnector being pierced by a fuel supply conduit opening into the cell on an anode side, and by a conduit for recovering the water produced, on a periphery of the cell on the anode side, so as to provide uniform distribution of the fuel supplied and the water produced, respectively, from the supply conduit to the conduit for recovering the water; the second interconnector being pierced by a conduit for supplying air or oxygen, opening into the cell on a cathode side, and by a conduit for recovering the surplus air or oxygen; opening on the periphery of the cell on the cathode side so as to provide uniform distribution of the air or oxygen from the conduit for supplying air or oxygen to the conduit recovering the surplus air or oxygen;
    a first sealing gasket placed on a periphery of the elementary cell, bearing against the first interconnector and the second interconnector simultaneously;
    a second sealing gasket placed on a periphery of the cathode of the elementary cell, beating against the second interconnector and the electrolyte simultaneously; the first and second sealing gaskets being glass- and/or glass ceramic-based;
    an insulating and sealing device placed on a periphery of the first sealing gasket and beating against the first and the second interconnector respectively; and
    at least one supply conduit and at least one recovery conduit for clamping gas, formed in the first and second interconnectors, each opening into a space delimited between the first gasket and the insulating and sealing device, so as to provide uniform distribution of the clamping gas from the supply conduit to the recovery conduit for the clamping gas, the clamping gas thus also forming a balancing gas for balancing pressures on either side of the first sealing gasket during pressurized operation of the cell;
    wherein the supply and recovery conduits of the clamping and balancing gas open into the clamping chamber.

6. An operating method for the operation of an SOFC fuel cell according to claim 5, comprising:
    supplying the supply conduits with fuel such as hydrogen or methane, and simultaneously supplying the supply conduits with clamping and balancing gas;
    supplying the supply conduits with air or oxygen, pressure of the fuel and of the air or oxygen supplied being substantially equal to that of the clamping and balancing gas; and
    recovering the surplus fuel, the clamping and balancing gas that has circulated in the clamping chamber, and the water produced, on the one hand, and the surplus air or oxygen, on the other hand, in their respective recovery conduits.

7. The operating method of an SOEC electrolysis or co-electrolysis reactor or SOFC fuel cell according to claim 6, wherein temperature of the clamping and balancing gas is raised or lowered in the supply conduits so as to raise or lower, respectively, temperature of the stack.

8. The operating method of an SOEC electrolysis or co-electrolysis reactor or SOFC fuel cell according to claim 6, wherein, during operation, the pressure of the clamping and balancing gas in the supply conduits is increased while pressure of reactive gases is maintained, a difference between the increased pressure of the clamping and balancing gas and the pressure of the reactive gases being equal to not more than 500 mbar.

9. The operating method for the operation of an SOEC electrolysis or co-electrolysis reactor or SOFC fuel cell according to claim 6, wherein any presence of fuel leaks in the clamping and balancing conduits containing air is detected.

10. The SOEC electrolysis or co-electrolysis reactor or SOFC fuel cell according to claim 1, wherein the clamping gas circuit is passing through the stack.

11. The SOEC electrolysis or co-electrolysis reactor according to claim 10,
wherein the stack is a stack of elementary units, each elementary unit comprising:
an elementary electrochemical cell formed by a cathode, an anode, and an electrolyte intercalated between the cathode and the anode,
a first and a second device, each forming an electrical and fluid interconnector, each consisting of a component of electronically conductive, gas-tight material, the first and second interconnectors being placed on either side of the elementary cell, the first interconnector being pierced by a water vapor supply conduit opening into the cell on a cathode side, and by a conduit for recovering hydrogen produced, opening on a periphery of the cell on the cathode side, so as to provide uniform distribution of water vapor supplied and the hydrogen produced, respectively, from the supply conduit to the conduit for recovering hydrogen; the second interconnector being pierced by a conduit for recovering the oxygen produced, opening on the periphery of the cell on an anode side, so as to provide uniform distribution of the oxygen produced to the conduit for recovering the oxygen;
a first sealing gasket placed on a periphery of the elementary cell, bearing against the first interconnector and the second interconnector simultaneously;
a second sealing gasket placed on a periphery of the anode of the elementary cell, bearing against the second interconnector and the electrolyte simultaneously, the first and second sealing gaskets being glass- and/or glass ceramic-based;
an insulating and sealing device placed on a periphery of the first sealing gasket and bearing against the first and the second interconnector respectively; and
at least one supply conduit and at least one recovery conduit for clamping gas, formed in the first and second interconnectors, each opening into a space delimited between the first gasket and the insulating and sealing device, so as to provide uniform distribution of the clamping gas from the supply conduit to the recovery conduit for the clamping gas, the clamping gas thus also forming a balancing gas for balancing pressures on either side of the first sealing gasket during pressurized operation of the reactor;
wherein the supply and recovery conduits of the clamping and balancing gas open into the clamping chamber.

12. The SOEC electrolysis or co-electrolysis reactor according to claim 11, wherein the second interconnector is pierced by a conduit for supplying drainage gas to the cell on the anode side, so as to provide a uniform distribution of the supplied drainage gas and of the oxygen produced, respectively, from the supply conduit to the recovery conduit for the clamping and balancing gas.

13. The SOEC electrolysis or co-electrolysis reactor or SOFC fuel cell according to claim 11, wherein each insulating and sealing device consists of an insulating washer and of third and fourth metal gaskets on either side of the insulating washer.

14. An operating method of an SOEC electrolysis or co-electrolysis reactor according to claim 10, comprising:

supplying supply conduits with water vapor or a mixture of water vapor and another gas selected from carbon dioxide and nitrogen dioxide, and simultaneously supplying the supply conduits with clamping and balancing gas, pressure of the water vapor or of the mixture supplied being substantially equal to that of the clamping and balancing gas; and
recovering hydrogen, or the hydrogen and carbon monoxide or nitrogen monoxide, produced by electrolysis or co-electrolysis of the water vapor, and recovering at the same time the balancing gas that has circulated in the clamping chamber, in their respective recovery conduits.

15. The operating method according to claim 14, wherein supplying the supply conduits with drainage gas, pressure of the drainage gas supplied being substantially equal to that of the clamping and balancing gas, and recovering oxygen produced.

16. The operating method of an SOEC electrolysis or co-electrolysis reactor or SOFC fuel cell according to claim 14, wherein temperature of the clamping and balancing gas is raised or lowered in the supply conduits so as to raise or lower, respectively, temperature of the stack.

17. The operating method of an SOEC electrolysis or co-electrolysis reactor or SOFC fuel cell according to claim 14, wherein, during operation, the pressure of the clamping and balancing gas in the supply conduits is increased while pressure of reactive gases is maintained, a difference between the increased pressure of the clamping and balancing gas and the pressure of the reactive gases being equal to not more than 500 mbar.

18. The operating method for the operation of an SOEC electrolysis or co-electrolysis reactor or SOFC fuel cell according to claim 14, wherein any presence of fuel leaks in the clamping and balancing conduits containing air is detected.

19. The SOEC electrolysis or co-electrolysis reactor or SOFC fuel cell according to claim 1, wherein a general shape of the stack, of the end plates and of the clamping chamber is axisymmetric.

20. The SOEC electrolysis or co-electrolysis reactor or SOFC fuel cell according to claim 19, wherein the clamping chamber is delimited by a top of an upper terminal plate forming a bottom, by a solid plate forming a cover, and by a ring forming a side wall, the bottom, the cover and the side wall of the chamber being assembled to one another by welding.

21. The SOEC electrolysis or co-electrolysis reactor or SOFC fuel cell according to claim 1, wherein the clamping chamber is delimited above the stack, between an upper terminal plate and an upper clamping plate, separated by an electrical insulation plate.

22. The SOEC electrolysis or co-electrolysis reactor or SOFC fuel cell according to claim 1, wherein the clamping means comprise two clamping bolts placed so that they pass through the clamping plates.

23. The SOEC electrolysis or co-electrolysis reactor or SOFC fuel cell according to claim 22, wherein each clamping bolt comprises:
a threaded clamping shank,
a first clamping nut associated with a first clamping washer, both of which are configured to interact by screwing with the threaded clamping shank inserted through a clamping aperture in an upper clamping plate, the first clamping washer being placed between the first clamping nut and the upper clamping plate; and a second clamping nut associated with a second clamping washer, both of which are configured to interact by screwing with the threaded clamping shank inserted through a clamping aperture in a lower clamping plate, the second clamping washer being placed between the second clamping nut and the lower clamping plat.

24. The SOEC electrolysis or co-electrolysis reactor or SOFC fuel cell according to claim 23, further comprising an electrically insulating tube placed between the clamping shank and the clamping aperture of the lower clamping plate, the second clamping washer also being electrically insulating.

* * * * *